US012296911B2

(12) United States Patent
Miglioranza

(10) Patent No.: US 12,296,911 B2
(45) Date of Patent: May 13, 2025

(54) BICYCLE ELECTRONIC EQUIPMENT

(71) Applicant: CAMPAGNOLO S.R.L., Vicenza (IT)

(72) Inventor: Federico Miglioranza, Schio (IT)

(73) Assignee: CAMPAGNOLO S.R.L., Vicenza (IT)

(*) Notice: Subject to any disclaimer, the term of this patent is extended or adjusted under 35 U.S.C. 154(b) by 250 days.

(21) Appl. No.: 17/954,013

(22) Filed: Sep. 27, 2022

(65) Prior Publication Data

US 2023/0102759 A1    Mar. 30, 2023

(30) Foreign Application Priority Data

Sep. 28, 2021   (IT) .................. 102021000024800

(51) Int. Cl.
*B62J 6/16*      (2020.01)
*B62J 6/01*      (2020.01)
*B62J 45/20*     (2020.01)
*B62K 23/02*     (2006.01)
(Continued)

(52) U.S. Cl.
CPC .  *B62J 6/16* (2013.01); *B62J 6/01* (2020.02); *B62J 45/20* (2020.02); *B62M 9/122* (2013.01); *B62M 9/132* (2013.01); *B62K 23/02* (2013.01)

(58) Field of Classification Search
CPC ....... B62J 6/16; B62J 6/01; B62J 45/20; B62J 6/24; B62J 6/26; B62J 50/22; B62J 6/028; B62J 6/029; B62J 6/056; B62J 50/20; B62M 9/122; B62M 9/132; B62M 9/128; B62M 9/138; B62M 3/16; B62M 9/125;
(Continued)

(56) References Cited

U.S. PATENT DOCUMENTS

| 5,881,823 A | 3/1999 | Kabatnik et al. |
| 10,793,222 B1 | 10/2020 | Harris |
| 10,981,625 B2 | 4/2021 | Brown et al. |

(Continued)

FOREIGN PATENT DOCUMENTS

| EP | 3002185 A1 | 4/2016 |
| EP | 3279074 A1 | 2/2018 |

(Continued)

OTHER PUBLICATIONS

Notice of Allowance issued for U.S. Appl. No. 17/953,997, filed Sep. 27, 2022 on behalf of Campagnolo S.R.L. Mail Date: Jul. 25, 2023. 16 Pages.

(Continued)

*Primary Examiner* — Abby Y Lin
*Assistant Examiner* — Esvinder Singh
(74) *Attorney, Agent, or Firm* — Steinfl + Bruno LLP

(57) ABSTRACT

A bicycle electronic equipment configured to be attached to a location of the bicycle includes a data processing system, a multicolour light source, and a switch. The switch includes a push-button and a two-state electric circuit. The data processing system is configured to: (a) make the light source emit cyclically repeating N coloured light emitting patterns, with N>=3, wherein coloured light emitting patterns immediately consecutive in the cyclical repetition differ in color and/or type of emitting pattern; (b) monitor the state of the switch during execution of step (a); and (c) perform a different action among N different actions according to which of the N coloured light emitting patterns the source is emitting upon the state switching of the switch.

17 Claims, 17 Drawing Sheets

(51) Int. Cl.
*B62M 9/122* (2010.01)
*B62M 9/132* (2010.01)

(58) Field of Classification Search
CPC ........ B62K 23/02; H05B 45/20; H05B 47/10; H05B 47/16; H05B 47/165; B62L 3/02
See application file for complete search history.

(56) References Cited

U.S. PATENT DOCUMENTS

| | | |
|---|---|---|
| 11,618,532 B2 | 4/2023 | Jordan |
| 11,697,474 B2 | 7/2023 | Fujimoto |
| 2007/0037645 A1 | 2/2007 | Ishikawa |
| 2014/0087901 A1 | 3/2014 | Shipman et al. |
| 2014/0114538 A1 | 4/2014 | Shipman et al. |
| 2014/0155204 A1 | 6/2014 | Emura et al. |
| 2014/0323254 A1 | 10/2014 | Kuwayama et al. |
| 2015/0111675 A1 | 4/2015 | Shipman et al. |
| 2015/0353166 A1 | 12/2015 | Kuwayama et al. |
| 2016/0096571 A1* | 4/2016 | Fusari ................. B62J 6/056 362/473 |
| 2017/0101155 A1 | 4/2017 | Tachibana et al. |
| 2017/0113759 A1 | 4/2017 | Watarai et al. |
| 2017/0120983 A1 | 5/2017 | Komatsu et al. |
| 2017/0197685 A1 | 7/2017 | Braedt et al. |
| 2018/0001960 A1 | 1/2018 | Pasqua |
| 2018/0037299 A1* | 2/2018 | Masciolini ............ B62M 9/131 |
| 2018/0078731 A1* | 3/2018 | Wendt .................. H05B 45/10 |
| 2018/0168332 A1* | 6/2018 | Wagner ................ A61C 1/088 |
| 2018/0229803 A1 | 8/2018 | Wesling |
| 2018/0237104 A1 | 8/2018 | Pasqua et al. |
| 2018/0257736 A1 | 9/2018 | Komatsu et al. |
| 2018/0257737 A1 | 9/2018 | Komatsu et al. |
| 2018/0260107 A1* | 9/2018 | Dare ................. G06Q 30/0641 |
| 2018/0274623 A1 | 9/2018 | Brown et al. |
| 2018/0300993 A1* | 10/2018 | Corradini ............. B62J 6/057 |
| 2019/0040676 A1* | 2/2019 | Mullet ................. E06B 9/322 |
| 2019/0100279 A1 | 4/2019 | Brown et al. |
| 2019/0100280 A1 | 4/2019 | Brown et al. |
| 2019/0144071 A1 | 5/2019 | Boehm et al. |
| 2019/0300111 A1 | 10/2019 | Liao et al. |
| 2019/0300112 A1 | 10/2019 | Liao et al. |
| 2019/0351971 A1 | 11/2019 | Dueweling et al. |
| 2020/0156737 A1 | 5/2020 | Liao et al. |
| 2020/0189688 A1 | 6/2020 | Rodgers et al. |
| 2020/0262511 A1 | 8/2020 | Hahn et al. |
| 2020/0298934 A1 | 9/2020 | Wu et al. |
| 2020/0339220 A1 | 10/2020 | Boehm et al. |
| 2020/0346714 A1 | 11/2020 | Hahn |
| 2020/0377175 A1 | 12/2020 | Fujimoto |
| 2021/0061413 A1 | 3/2021 | Ichida et al. |
| 2021/0129938 A1 | 5/2021 | Sala |
| 2021/0129939 A1 | 5/2021 | Sala |
| 2021/0188393 A1 | 6/2021 | Hahn |
| 2022/0322507 A1* | 10/2022 | Ormsbee ................ H05B 45/20 |
| 2022/0388604 A1* | 12/2022 | Zubieta Andueza .. B62M 9/125 |
| 2022/0411017 A1 | 12/2022 | Braedt et al. |
| 2023/0021733 A1 | 1/2023 | Endo et al. |
| 2023/0093851 A1 | 3/2023 | De Poli |
| 2023/0094161 A1 | 3/2023 | Sala |
| 2023/0304596 A1* | 9/2023 | Grogg .................. F16K 31/041 |

FOREIGN PATENT DOCUMENTS

| | | |
|---|---|---|
| EP | 3385154 A1 | 10/2018 |
| WO | 2021080995 A1 | 4/2021 |
| WO | 2021099208 A1 | 5/2021 |

OTHER PUBLICATIONS

Search Report for Italian Application No. 102021000024725 dated Jun. 10, 2022.
Search Report for Italian Application No. 102021000024800 dated Jun. 15, 2022.

* cited by examiner

BICYCLE ELECTRONIC EQUIPMENT

CROSS REFERENCE TO RELATED APPLICATIONS

This application claims the benefit of Italian Patent Application No. 102021000024800, filed on Sep. 28, 2021, which is incorporated herein by reference as if fully set forth.

FIELD OF INVENTION

The present invention relates in general to a bicycle electronic equipment.

BACKGROUND

Bicycle electronic equipment comprise for example a derailleur associated with the bottom bracket spindle, a derailleur associated with the hub of the rear wheel, a suspension, a saddle setting adjuster, a lighting system, a satellite navigator, a training device, an anti-theft device, a cycle computer capable of providing information on the status of the bicycle, of the cyclist and/or of the route, a torque or power meter, a motor of a pedal assisted bicycle, a manual control device of another equipment, and others.

The technical problem at the basis of the invention is to provide a bicycle electronic equipment that may receive plural commands from a human operator still remaining constructively small and light and consume little electricity.

SUMMARY

A piece of bicycle electronic equipment to be attached to a location of the bicycle includes a data processing system, a multicolour light source, and a switch. The switch includes a push-button and a two-state electric circuit. The data processing system is configured: (a) to make the light source emit cyclically repeating N coloured light emitting patterns, with N>=3, wherein coloured light emitting patterns immediately consecutive in the cyclical repetition differ in color and/or type of emitting pattern; (b) to monitor the state of the switch during execution of step (a); and (c) to perform a different action, among N different actions, according to which of the N coloured light emitting patterns the source is emitting upon the state switching of the switch.

BRIEF DESCRIPTION OF THE DRAWINGS

Further features and advantages of the present invention will become clearer from the following detailed description of some preferred embodiments thereof, made with reference to the attached drawings, wherein.

DETAILED DESCRIPTION OF EMBODIMENTS

Figure 1:
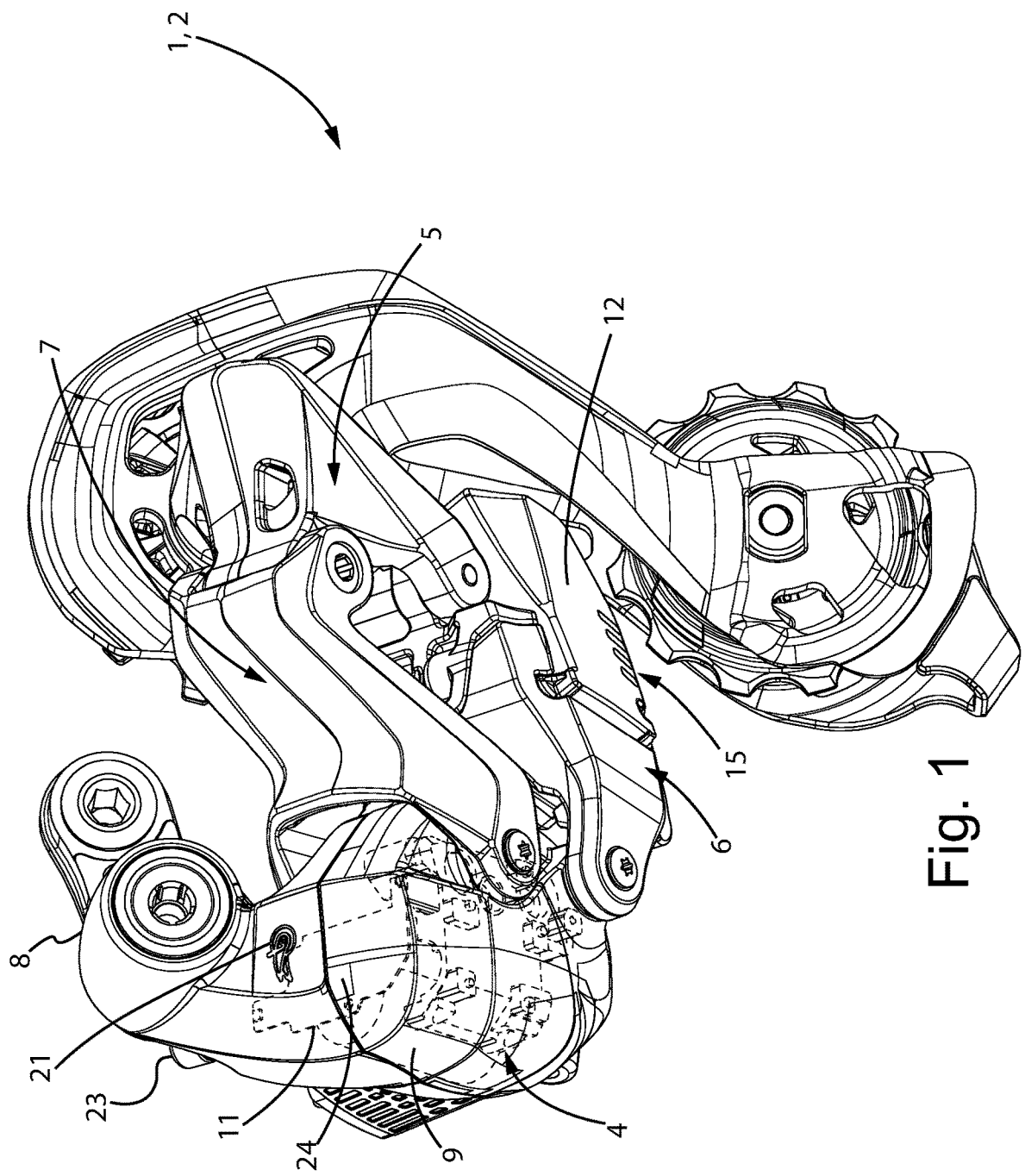
FIG. 1 is a perspective view of a bicycle electronic equipment.

A bicycle may be provided with plural pieces of electronic equipment, possibly connected to each other in a communication network, which may be cabled or wireless. Some illustrative electronic equipment have been listed in the introductory part and the invention applies in general to each of them.

In the present disclosure, under "equipment" a set of components mechanically coupled with each other and configured to be attached to the bicycle in a single location is meant to be indicated. Thus, the equipment may comprise for example a derailleur or a manual control device for a derailleur fixable to the handlebar or in the proximity thereto, but not the assembly of both.

Bicycle electronic equipment may perform various functions and may comprise their own data processing system that, for example, controls a geared motor or other device and/or processes signals provided by sensors and/or receives commands from an operator, typically the cyclist or a mechanical and/or manages the communication network and/or manages the communications in the network, with the aid of a communication device, etc.

There may be the need of inputting commands for the controller of such a bicycle electronic equipment.

In an aspect, the invention relates to a bicycle electronic equipment configured to be attached to the bicycle in a single location, comprising a data processing system, a multicolour light source, and a switch comprising a manual actuation push-button and a two-state electric circuit, wherein the data processing system is configured to, in a first mode, a) make the light source emit cyclically repeating a first number N of coloured light emitting patterns, with N>=3, wherein coloured light emitting patterns immediately consecutive in the cyclical repetition differ in color and/or type of emitting pattern, b) monitor the state of the switch during execution of step a), and c) perform a different action among a plurality of the first number N of different actions according to which of said N coloured light emitting patterns the source is emitting upon the state switching of the switch.

In this manner, a single push-button suffices to receive a plurality of different commands from the user, and the bicycle equipment may be small and light, all factors of great importance in the field of bicycle components.

In the present disclosure, expression "cyclically repeating" is meant to indicate that the coloured light emitting pattern is changed, within the set of the N coloured light emitting patterns, at one or more prefixed time intervals, so that the source may emit each of the N patterns, for a respective prefixed time duration, preferably for the same prefixed time duration.

In the present disclosure, under expression "push-button", the member of the switch is meant to be indicated, pressing and respectively releasing which, a state switching of the circuit is determined.

In the present disclosure, term "mode" referred to the data processing system is used to identify a given portion of instructions executable by the data processing system, without necessarily implying any change of the status of the data processing system or of the bicycle equipment comprising it.

In the present disclosure, term "action" is used broadly and may encompass any sequence of instructions, which may involve the source or not, and which may involve the user, regarding interaction with the push-button and/or with other devices and components of the bicycle equipment, or not.

The two states of the switch may comprise an unstable state corresponding to pressed push-button and a stable state corresponding to not pressed push-button.

The data processing system may be configured to make the light source emit a coloured light emitting pattern, upon the state switching of the switch before performing step c).

Preferably this coloured light emitting pattern differs in type of emitting pattern and is equal in colour(s) with respect to the coloured light emitting pattern according to which the source is emitting upon the state switching of the switch.

The data processing system may be configured to set up in the first mode upon a second state switching of the switch while it is in a second mode.

In the present disclosure, the ordinal numbers referred to the state switchings should be understood merely as qualifiers in order to distinguish them from each other, without implying neither any specific time sequence thereof, indicated instead with the adjectives "prior" and "successive", nor the fact that it is a matter of opposite state switchings between the two states of the two-state electric circuit. In particular, said second state switching precedes in time said first state switching.

The second state switching is preferably opposed with respect to the first state switching.

The data processing system may be configured to, in the second mode, d) make the light source emit cyclically repeating a second number M of coloured light emitting patterns, with M>=3, said second number M being equal to or different from, and preferably equal to, the first number N, wherein coloured light emitting patterns immediately consecutive in the cyclic repetition differ in colour and/or type of emitting pattern, and e) monitor the state of the switch during the execution of step a) in order to detect said second state switching.

Preferably, the data processing system is configured to, in the second mode, d) make the light source emit cyclically repeating said N coloured light emitting patterns, monitoring the state of the switch.

It is noted that in both cases, the second mode is different from the first mode in that the data processing system ignores, in the sense of not considering, the specific coloured light emitting pattern which the source is emitting upon the state switching of the switch.

The data processing system may be configured to set up in the second mode after having counted through a timer the passing of a first prefixed time duration from a third state switching of the switch without a fourth state switching of the switch intervening.

The data processing system may be configured to, in a third mode, starting from a state switching of the switch, define two or more time periods, performing a different action and exiting from the third mode upon a successive state switching in each time period different from the last one, and setting up in the second mode in the last of said time periods, and, in case the time periods are more than two, making the light source emit a coloured light emitting pattern, preferably different from said N, and possibly from said M, coloured light emitting patterns, between two consecutive time periods not including the latest one.

The time periods apart from the latest one preferably have a respective prefixed time duration, preferably different.

The data processing system may be configured to monitor also the passing of one or more prefixed maximum time intervals from one or more events, in particular following a state switching of the switch without any opposed state switching of the switch, and to set up in a different operating mode upon passing of the prefixed maximum time interval(s).

The data processing system may comprise a fully operating mode and a low consumption mode and be configured not to be awakened from the low consumption mode by actuation of the push-button and/or to ignore the status of the switch while it is in low consumption mode.

The bicycle equipment may comprise an electric power supply unit provided with its own data processing system and with an array of light sources, and one of the above mentioned actions may be the issue from said data processing system to the data processing system of the electric power supply unit of a request to switch on a percentage of light sources of the array proportional to the percentage of residual charge.

The data processing system may be configured to, before, during or after the execution of one of the above mentioned actions, and/or in a mode different from the above mentioned modes, make the light source emit a coloured light emitting pattern, among said N coloured light emitting patterns or different from said N -and possibly M-coloured light emitting patterns, in order to provide a visual indication to the user relating to the execution of the action.

In this case, the light may be emitted for a prefixed time interval or until a prefixed event internal to the bicycle equipment or until an event performed by the user.

Each of said coloured light emitting patterns may be selected among:
  continuous emission of a single colour,
  emission in the form of a pulse of one colour,
  emission in the form of a pulse train at a preselected frequency, of a single colour,
  emission in the form of a pulse train at a preselected frequency, of two or more alternate colours,
  emission in any combination thereof,
  wherein said preselected frequency may be individually selected for each of said coloured light emitting patterns.

In the present disclosure, term "pulse" with reference to light emission by the source should be meant to indicate a duration sufficient to be visually perceived.

The data processing system may be configured to wait, in the execution of an action, that the user acts again on the push-button.

Each of said actions may be selected from the group comprising:
  the controller performs a factory reset of its own parameters and/or of the parameters of other devices of the bicycle equipment,
  the controller sets up in a firmware update mode or Device Firmware Update or DFU mode, wherein it may receive an update from a device external to the bicycle equipment, through the communication device, the controller sets up or attempts at setting up a new network or a previously set up network, with one or more other pieces of bicycle equipment, with a master or "central" role, or with a slave or "peripheral" role, the controller deletes a "whitelist" of components of a previously set up communication network, the controller commands to the electric power supply unit, in the case wherein this is a smart battery provided with its own controller and provided with the array of light sources, to switch on a percentage of light sources proportional to the residual charge percentage, the controller sets up in an adjustment mode of its own parameters and/or of the parameters of other devices of the bicycle equipment, what possibly includes communication with another bicycle equipment in communication with that bearing the controller.

The push-button may be the only manual actuation member of the push-button type provided on the bicycle electronic equipment, preferably the only manual actuation member provided on the bicycle electronic equipment.

In the case of some bicycle electronic equipment, for example in the case of manual control devices attachable to the handlebar or in proximity thereto, typically other manual actuation members, for example of the lever type, are provided for. However, also in these cases the user interface described above, which, with a single push-button, allows a congruous number of commands to be input, makes the bicycle electronic equipment smaller and lighter with respect to the provision of more complex user interfaces, the feasible functions being equal.

The bicycle electronic equipment may be a derailleur, and preferably the source may be in a position visible while mounting the derailleur on the bicycle and/or, during use, by a person not on board of the bicycle, for example by a travel companion.

The light source and the data processing system and the push-button may be housed in the support body.

When the derailleur is a rear derailleur, the electric power supply unit may be supported by a connecting arm, preferably by the proximal connecting arm. When the derailleur is a front derailleur, the electric power supply unit may be supported by the support body.

In the switch, the manual actuation push-button may comprise a magnet and the two-state electric circuit may comprise a magnetic sensor.

A component of the bicycle electronic equipment may feature a sliding seat of the push-button, the push-button comprising a main body to a first end of which the magnet is fixed, and being slidable in the sliding seat between an extracted position wherein a second end thereof opposed to the first end protrudes at least partially from the sliding seat so that it can be pressed, and a retracted position wherein the second end does not protrude or protrudes less from the sliding seat; the push-button and the two-state electric circuit may be so mutually positioned that the magnetic sensor responds to a change in the magnetic field when the push-button moves between the extracted and retracted positions; the sliding seat may comprise a blind hole; a sealing gasket may be operatively interposed between the main body and the blind hole; and the two-state electric circuit may be housed in a hermetically closed chamber of the bicycle electronic equipment.

The push-button may comprise a compression spring, housed in the blind hole and acting by pushing on the main body, in order to urge the push-button towards the extracted position.

The push-button may comprise an elastically yielding cap, which covers the main body, at its second end.

The cap may have a bellows-like region.

The cap may be interference fitted on the main body, at its second end.

Alternatively or additionally, a component of the bicycle electronic equipment may feature a sliding seat of the push-button, wherein the push-button is slidable in the sliding seat between a fully advanced position wherein an end thereof protrudes at least partially from the sliding seat so that it can be pressed, and a fully retracted position wherein said end does not protrude or protrudes less from the sliding seat, wherein the sliding seat comprises a blind hole, wherein an annular seat is defined in a region of sliding fit between the main body of the push-button and a through cavity provided in the sliding seat, and wherein a ring gasket is housed compressed in the annular seat, wherein in at least one region, the annular seat has two portions comparatively smaller in a radial direction and an intermediate portion therebetween, the intermediate portion being comparatively larger than said two portions in the radial direction, so that in the fully advanced position of the push-button, a portion of the gasket bridges the intermediate portion between said two portions, and while the push-button retracts, the portion of the gasket is free to curve in the intermediate portion of the annular seat.

In the present disclosure, under "sliding", a type of clearance fit wherein the force may not be transmitted by the coupling force alone is meant to be indicated.

The Applicant has recognised that the local deformation of the gasket in the annular seat, establishing a gap between the gasket and the main body of the push-button, counteracts the establishment of an overpressure in the blind hole itself, so that the resistance offered by the sliding seat against the press of the push-button is not increased by the overpressure, thus requiring less physical effort with the finger. Furthermore, the gap acts as a vent for air from the blind hole during the press of the push-button, favouring expulsion of dust particles, dirt and water possibly present in the proximity of the mouth of the blind hole of the seat, hindering entry thereof in the blind hole of the seat where they could jam or in any case hinder proper operation of the push-button.

The extent in radial direction of the intermediate section may be continuously variable from a maximum value at the center thereof, to the value of said two portions.

The push-button may comprise elastic means urging the push-button towards the advanced position, in particular at least one compression spring housed in the blind hole and acting by pushing on the main body of the push-button. In case said one or more compression springs are provided for, the problem of entry of dirt and humidity in the blind hole is particularly felt.

Said at least one region of the sliding fit region between the main body of the push-button and the through cavity provided for in the sliding seat may also comprise two regions, in particular two diametrically opposed regions.

In an aspect, the invention relates to a bicycle electronic equipment configured to be attached to the bicycle in a single location, comprising a data processing system, a multicolour light source, and a switch comprising a manual actuation push-button and a two-state electric circuit, wherein the data processing system is configured to, in a first mode, a) make the light source emit cyclically repeating a first number N of coloured light emitting patterns, with N>=3, wherein coloured light emitting patterns immediately consecutive in the cyclic repetition differ in colour, b) monitor the state of the switch during the execution of step a), and c) perform a different action among a plurality of the first number N of different actions according to which among said N coloured light emitting patterns the source is emitting upon the state switching of the switch.

In an aspect, the invention relates to a bicycle electronic equipment comprising a switch, wherein the switch comprises:

a manual actuation push-button comprising a main body to a first end of which a magnet is fixed and a two-states electric circuit comprising a magnetic sensor, wherein a component of the equipment has a sliding seat of the push-button, the push-button being slidable in the sliding seat between an extracted position wherein a first end thereof protrudes at least partially from the sliding seat so that it can be pressed, and a retracted position wherein a second end thereof opposed to the first end does not protrude or protrudes less from the sliding seat, wherein the push-button and the two-state electric circuit are mutually positioned so that the magnetic sensor responds to a change in the magnetic field when the push-button moves between the extracted and retracted positions, wherein the sliding seat comprises a blind hole, wherein a sealing gasket is operatively interposed between the main body and the blind hole and wherein the two-state electric circuit is housed in a hermetically closed chamber of the bicycle electronic equipment.

To this aspect, one or more of the above described optional features apply.

In an aspect, the invention relates to a bicycle electronic equipment comprising a switch comprising a manual actuation push-button, wherein a component of the equipment has a sliding seat of the push-button, wherein the push-button is slidable in the sliding seat between a fully advanced position wherein an end thereof protrudes at least partially from the sliding seat so that it can be pressed, and a fully retracted position wherein said end does not protrude or protrudes less from the sliding seat, wherein the sliding seat comprises a blind hole, wherein an annular seat is defined in a sliding fit region between the main body of the push-button and a through cavity provided in the sliding seat, and wherein a ring gasket is housed compressed in the annular seat, wherein in at least one region, the annular seat has two portions comparatively smaller in a radial direction and an intermediate section therebetween, the intermediate section being comparatively larger than said two portions in the radial direction, so that in the fully advanced position of the push-button, a portion of the gasket bridges the intermediate section between said two portions, and while the push-button retracts, the portion of the gasket is free to curve in the intermediate section of the annular seat.

To this aspect, one or more of the above described optional features apply.

A bicycle electronic equipment configured to be attached to the bicycle in a single location, comprising a data processing system and a switch comprising a manual actuation push-button, wherein the data processing system comprises a fully operating mode and a low consumption mode, configured not to be awakened from the low consumption mode by actuation of the push-button and/or to ignore the state of the switch while it is in low consumption mode, represents an innovative aspect of the subject-matter disclosed herein, regardless of whether it is used in combination with other components and/or provisions described in the present disclosure.

To this aspect, one or more of the above described optional features apply.

A bicycle equipment provided with an electric power supply unit provided with its own data processing system and with an array of light sources and configured to switch on a percentage of light sources of the array proportional to the residual charge percentage upon request represents an innovative aspect of the subject-matter disclosed herein, regardless of whether it is used in combination with other components and/or provisions described in the present disclosure.

To this aspect, one or more of the above described optional features apply.

A bicycle electronic equipment configured to be attached to the bicycle in a single location, comprising a data processing system, a multicolour light source and a single manual actuation member comprising a manual actuation push-button paired with a two-state switch, represents an innovative aspect of the subject-matter disclosed herein, regardless of whether it is used in combination with other components and/or provisions described in the present disclosure.

To this aspect, one or more of the above described optional features apply.

Figure 2:
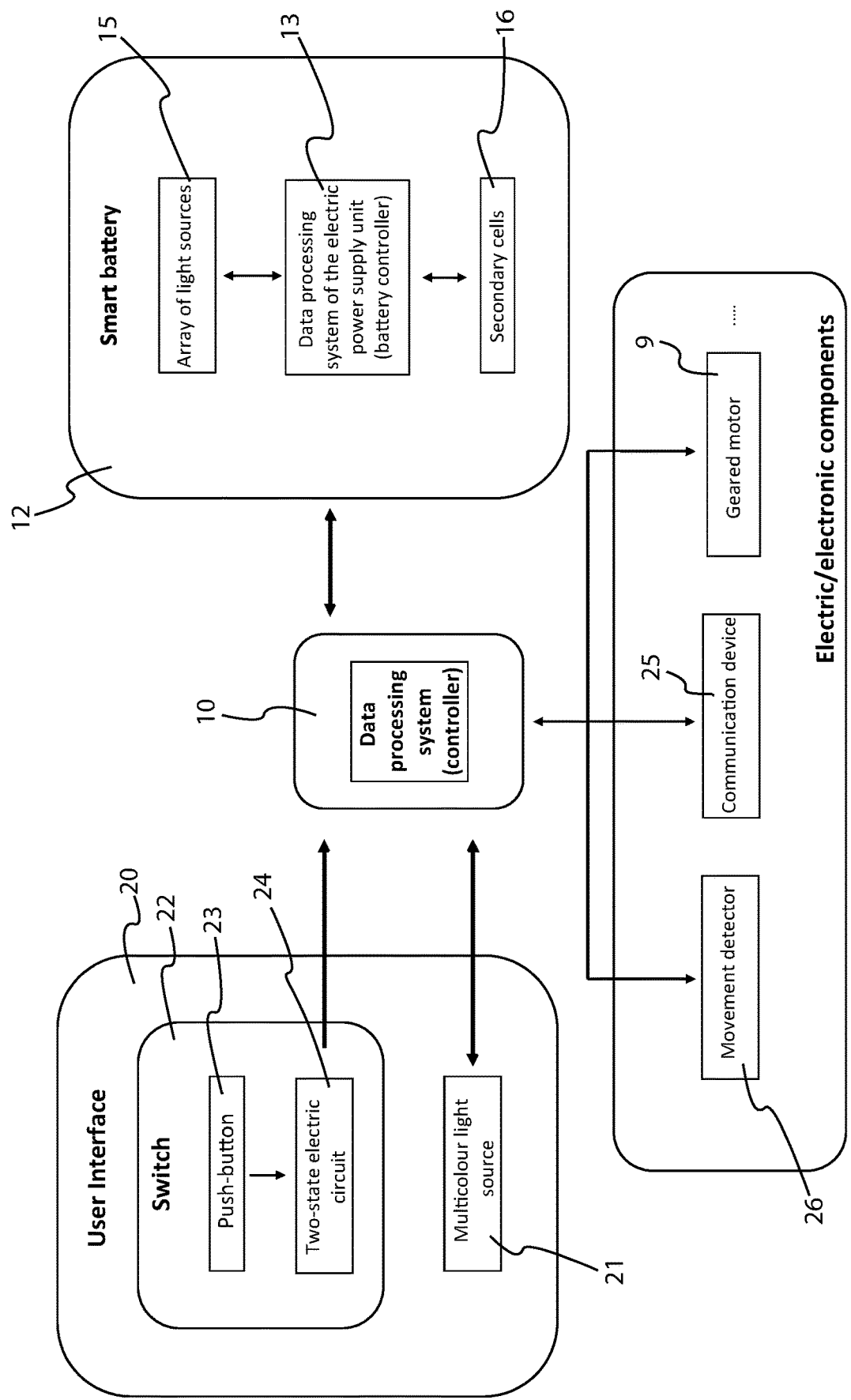
FIG. 2 is a non-limiting illustrative block diagram of the electric/electronic components of the bicycle electronic equipment of FIG. 1.

With reference to the drawings, in FIG. 1 an illustrative bicycle electronic equipment 1 is shown, and in FIG. 2 a non-limiting illustrative block diagram of its electric/electronic components is shown. In the present disclosure, expression "electric/electronic" is used to indicate an electric component that may also include electronic components and/or a data processing system.

In the case shown, the bicycle electronic equipment 1 is a rear electronic derailleur 2 comprising a support body 4 configured to be attached to a bicycle frame, a chain guide 5, and a pair of connecting arms 6, 7 extended between the support body 4 and the chain guide 5, forming a plurality of mutually movable components and in particular an articulated parallelogram. For example, the support body 4 may be attached to the frame through a screw or an articulated joint 8.

In the present disclosure, term "chain guide" is used to indicate the component which, overall, is moved with respect to the support body and to the connecting arms; in the case of a rear derailleur it may include a first member articulated in the articulated parallelogram, sometimes called "bottom body", and a second member movable therewith, sometimes called "rocker arm", while in the case of a front derailleur it typically comprises a single member, sometimes called "cage".

The derailleur 2 comprises a geared motor 9. In the present disclosure, under term "geared motor", a motor not coupled with any speed reducer is meant to be encompassed. In the case of the rear derailleur 2, the geared motor 9 controls the mutual motion between chain guide 5 and support body 4, in particular it determines the aperture and the closure of the articulated parallelogram, and therefore a displacement of the chain guide 5 having at least one displacement component in the direction of the axis of the group of toothed wheels associated with the hub of the rear wheel or "sprocket assembly", so as to bring the transmission chain or belt into engagement with a preselected toothed wheel or sprocket of the sprocket assembly.

The geared motor 9 is for example housed in the support body 4 and controls the rotation of one of the connecting arms 6, 7 (in the case shown, the proximal connecting arm 6) about an articulation axis thereof to the support body 4, but it could be housed elsewhere and/or differently control the aperture and closure of the articulated parallelogram.

The derailleur 2 comprises a data processing system 10, controlling the geared motor 9 and any other electric/electronic components of the derailleur 2. The data processing system 10 may comprise electric components and/or discrete electronic components and/or a micro-controller, which may also integrate memory means.

The data processing system 10 may be borne for example on at least one printed circuit board or PCB 11. For the sake of brevity, the data processing system 10 will sometimes be called controller 10 hereinafter.

The derailleur 2 shown further comprises an electric power supply unit 12, comprising one or more secondary cells 16 and a hermetic case housing said one or more secondary cells 16. The electric power supply unit 12 is, for example, attached in a removable manner to derailleur 2, in order to allow recharge thereof from the mains (possibly through a recharge cradle) and/or to allow its replacement in case of performance degradation and/or it may have a connector (not shown) for allowing on board recharge thereof.

The electric power supply unit 12 may be provided on a component different from that housing the geared motor 9, for example on the proximal connecting arm 6 as shown, but this is not strictly necessary.

Alternatively, the derailleur 2 or in general the bicycle electronic equipment 1 may be powered by an electric power supply unit of another equipment to which it is electrically connected.

The electric power supply unit 12 may also include its own data processing system 13, controlling the electric power supply unit 12 itself, borne for example by a PCB (not shown) housed in the hermetic case. The electric power supply unit 12 may thus be a so-called smart battery. For the sake of brevity, the data processing system 13 will sometimes be called battery controller 13 hereinbelow.

The electric power supply unit 12 may also include, as shown, an array of light sources 15, preferably aligned as shown. The array of light sources 15 may be arranged in a position visible while mounting the derailleur 2 on the bicycle and/or by a person not on board of the bicycle during its travel, for example by a travel companion.

The derailleur 2 comprises a user interface 20 for input of commands to the controller 10. The user interface 20 comprises a multicolour light source 21, hereinbelow sometimes just called light source 21 or just source 21 for the sake of brevity, and a switch 22. The switch 22, better described hereinbelow, comprises a manual actuation push-button 23, and a two-state electric circuit 24.

As said above, under expression "push-button" that member of the switch is meant to be indicated, pressing and respectively releasing which, a state switching of the two-state electric circuit 24 is determined.

The two states of the switch 22 may comprise an unstable state corresponding to pressed push-button and a stable state corresponding to not pressed push-button.

The user interface 20 and the controller 10 may be provided on the same component housing the geared motor 9, for example on the support body 4 as shown, but this is not strictly necessary. The switch 22 and the multicolour light source 21 of the user interface 20 might also be provided on a different component.

The multicolour light source 21 may be arranged in a position visible while mounting the derailleur 2 on the bicycle and/or by a person not on board of the bicycle during its travel, for example by a travel companion.

The derailleur 2 may further comprise a communication device 25, for example for communicating with other bicycle equipment mounted on the same bicycle and/or with a different device, for example a smartphone or similar. The communication device 25 may be for example a communication module, preferably a short range and low consumption one, for example according to the Bluetooth, Bluetooth Low Energy, and/or ANT+ protocol. In the block diagram of FIG. 2, the communication device 25 is indicated as a stand-alone component for the sake of clarity, but those skilled in the art will understand that it may also be implemented in a same microcontroller implementing other functionalities of the data processing system or controller 10 described herein.

The derailleur 2 may comprise a movement detector 26, for example an accelerometer and/or a vibration sensor.

The multicolour light source 21 and/or the two-state electric circuit 24 and/or the communication device 25 and/or the movement detector 26 may be housed on the same PCB 11 bearing the controller 10, or on one or more different PCB(s).

The multicolour light source 21 and the two-state electric circuit 24 are preferably housed on a same PCB, in particular on the PCB 11 bearing the controller 10.

Figure 3:
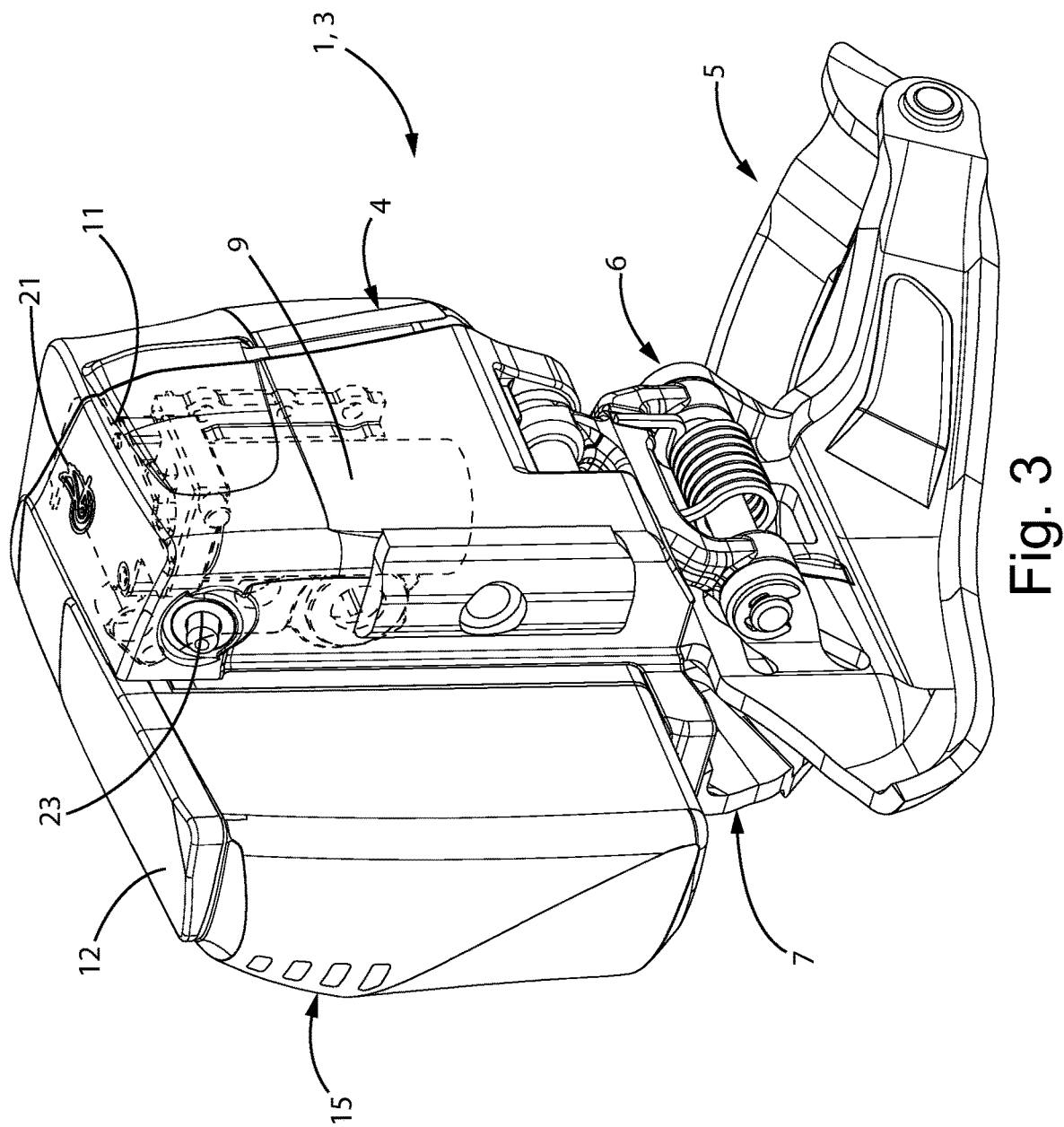
FIG. 3 is a perspective view of another bicycle electronic equipment.

In FIG. 3 another illustrative bicycle electronic equipment 1 is shown, that in the case shown is a front electronic derailleur 3. The front electronic derailleur 3 comprises components analogous to those described above with reference to the rear electronic derailleur 2, identified with the same reference numerals and that will not be described for the sake of brevity. In the case of the front electronic derailleur 3, the displacement of the chain guide 5 controlled by the geared motor 9 has a component in the direction of the bottom bracket spindle, so as to bring the transmission chain or belt into engagement with a predetermined toothed wheel or chainring of the crankset.

Figure 4:
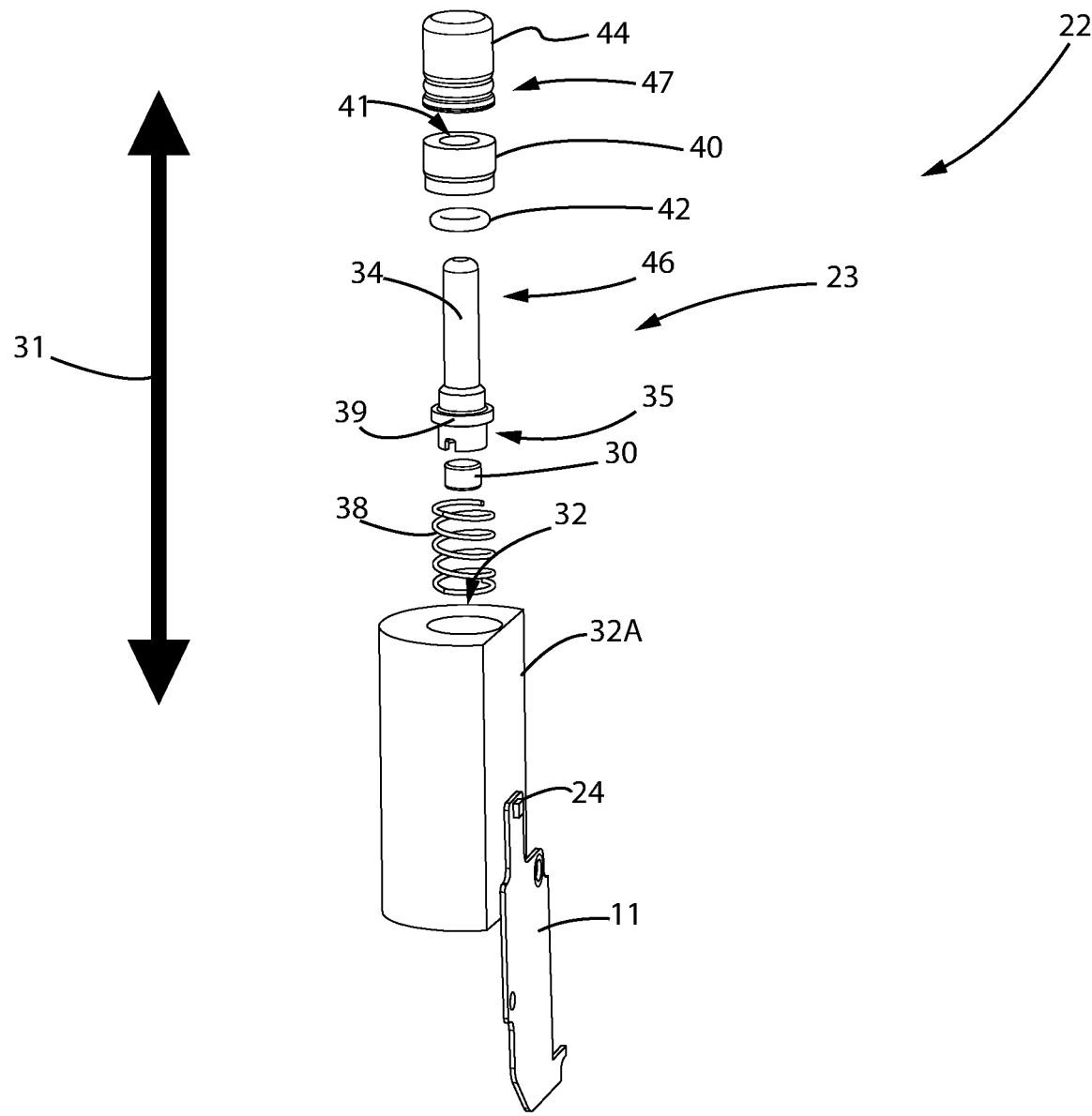
FIG. 4 is a partially exploded perspective view of a push-button of the bicycle equipment of FIG. 1, FIGS. 5 and 6 are sectional views of the push-button of FIG. 4, in two different operating conditions.
Figure 5:
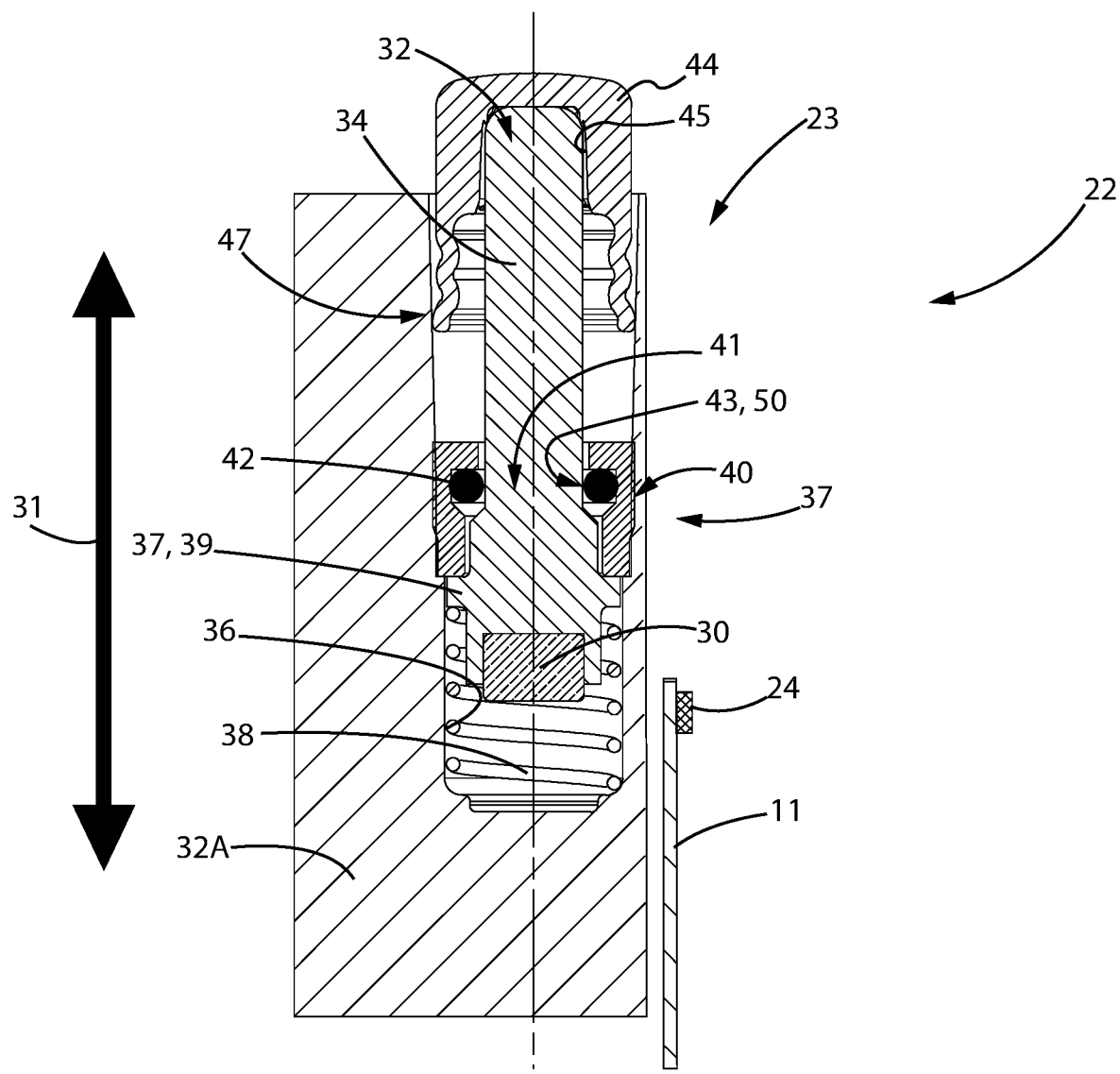
Figure 6:
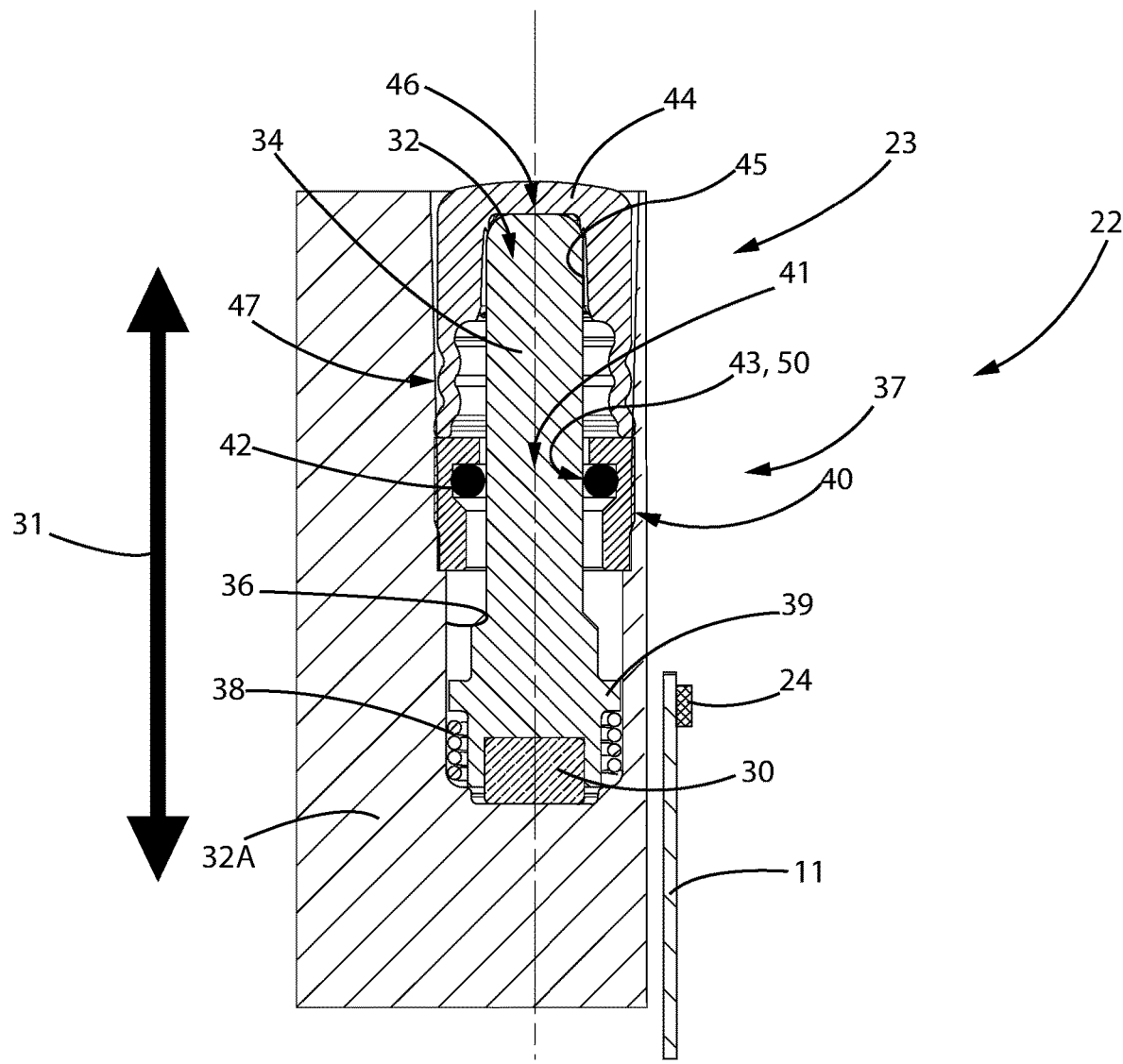

With reference also to FIGS. 4-6, switch 22 may comprise a magnetic sensor. In this case, the push-button 23 comprises a magnet 30, and the two-state electric circuit 24 comprises a magnetic sensor.

The magnetic sensor may be a Reed sensor, or alternatively it may be for example a 3D Hall sensor, or a magnetoresistive sensor, such as for example an AMR ("Anisotropic magneto resistive") sensor, a GMR ("Giant magneto resistive") sensor, or a ("Tunnel magneto resistive") sensor.

The push-button 23 is slidable along a sliding direction 31 in a sliding seat 32 between an extracted position wherein it protrudes at least partially from the sliding seat 32 so that it can be pressed with a finger, and a retracted position wherein it does not protrude or protrudes less from the sliding seat 32. In FIGS. 4-6 the seat 32 is shown as made in a special body 32A for the sake of clarity, but it is understood that the seat 32 is preferably directly made in the case of the support body 4 (or of another component 5, 6, 7) of the derailleur 2, 3.

The two-state electric circuit 24, sometimes called electric circuit 24 or circuit 24 for the sake of brevity, is shown as borne by the PCB 11 merely by way of a non-limiting example, as mentioned above.

The two-state electric circuit 24 comprising the magnetic sensor and the push-button 23 are mutually positioned so that the magnetic sensor responds to a change in the magnetic field when the push-button 23 moves between the extreme positions.

In the case shown, as long as the magnet 30 is in the position lifted from the bottom of the blind hole 36 of the sliding seat 32, the output of the magnetic sensor of the circuit 24 is for example in a low state; when the magnet 30 approaches the bottom of the blind hole 36 of the sliding seat 32, the circuit 24 switches state, for example its output switches to a high state; or the states of the output of the magnetic sensor of the circuit 24 may be inverted with respect to what has been stated above.

In greater detail, the push-button 23 comprises a main body 34 at an end 35 of which the magnet 30 is fixed.

The sliding seat 32 comprises a blind hole 36.

The push-button 23 comprises a compression spring 38, housed in the blind hole 36 and acting by pushing on the main body 34, for urging the push-button 23 towards the extracted position.

A collar 39 transversally protrudes from the main body 34, and the compression spring 38 urges on the collar 39. The end 35 bearing the magnet 30 is longitudinally inserted inside the compression spring 38.

A stop bushing 40 inserted on the main body 34, from the opposite side of the collar 39 with respect to the compression spring 38 is interference fitted in the blind hole 36 of the sliding seat 32 for retaining therein the main body 34 itself.

In a region 37, the main body 34 of the push-button 23 is in sliding fit with a through cavity 41 provided in the seat 32. In the present disclosure, under "sliding", a type of clearance fit wherein the force may not be transmitted by the coupling force alone is meant to be indicated.

In the sliding fit region 37 between the main body 34 of the push-button 23 and the through cavity 41 provided in the seat 32, an annular seat 50 is defined, wherein a ring gasket 42, for example an O-ring, is housed compressed.

In the case shown, the through cavity 41 is defined by a through hole 41 of the stop bushing 40, and the annular seat 50 is defined by an undercut groove of the stop bushing 40.

Alternatively, the annular seat may be defined for example in an undercut groove directly formed in the lateral wall of the blind hole 36.

The push-button 23 may further comprise a cap 44. The cap 44 may be made of an elastically yielding material, for example of rubber or silicone, having a blind hole 45. The cap 44 covers the main body 34 of the push-button 23, at its end 46 opposed to the end 35, so as to improve the tactile feeling, and furthermore it also serves, in the case shown, as a closure of the blind hole 36 of the sliding seat 32 in addition to the sealing gasket 42 and to the stop bushing 40.

The cap 44 may have a bellows region 47 in the lateral wall of the blind hole 45.

The cap 44 may be interference fitted on the main body 34, at its end 46 opposed to the end 35 bearing the magnet 30.

The sliding seat 32 may also comprise a guide channel contiguous to the blind hole 36, sized to accommodate at least in part the end 46 of the main body 34 of the push-button, with the possible cap 44, in the extracted condition of the push-button 23, protecting it against shocks. The guide channel is not, however, strictly necessary and is not shown in the figure.

The compression spring 38 might be absent or be replaced by other elastic means in order to urge the push-button 23 towards the advanced position.

Although the push-button 23 may also be made in a manner considerably different from what is shown, it is recognised that with the configuration shown, the magnet 30 and the compression spring 38 are hermetically closed in the blind hole 36 of the sliding seat 32, through the sealing gasket 42, as well as possibly through the cap 44. Therefore they are exposed to dust, water and other liquids that could impair their operation.

Furthermore, a switch 22 as described above allows the two-state electric circuit 24, comprising the magnetic sensor, to be contained in a separate chamber from the sliding seat 32 of the push-button 23, through the bottom or the lateral walls of the blind hole 36 of the seat itself, without openings being required for electric conductors to pass. The chamber housing the two-state electric circuit 24, and in particular the entire PCB 11 if possible also bearing the controller 10, may therefore be hermetically closed in a suitable manner.

The Applicant has recognized that during the push of the push-button 23, air is compressed by the push-button 23 inside the blind hole 36, so that an overpressure is established in the blind hole 36, tending to increase the resistance offered by the sliding seat 32, what not only increases the physical effort of the user, rather also entails the risk of breaking the main body 34 of the push-button 23 or the need to make it stronger and heavier.

Figure 7:
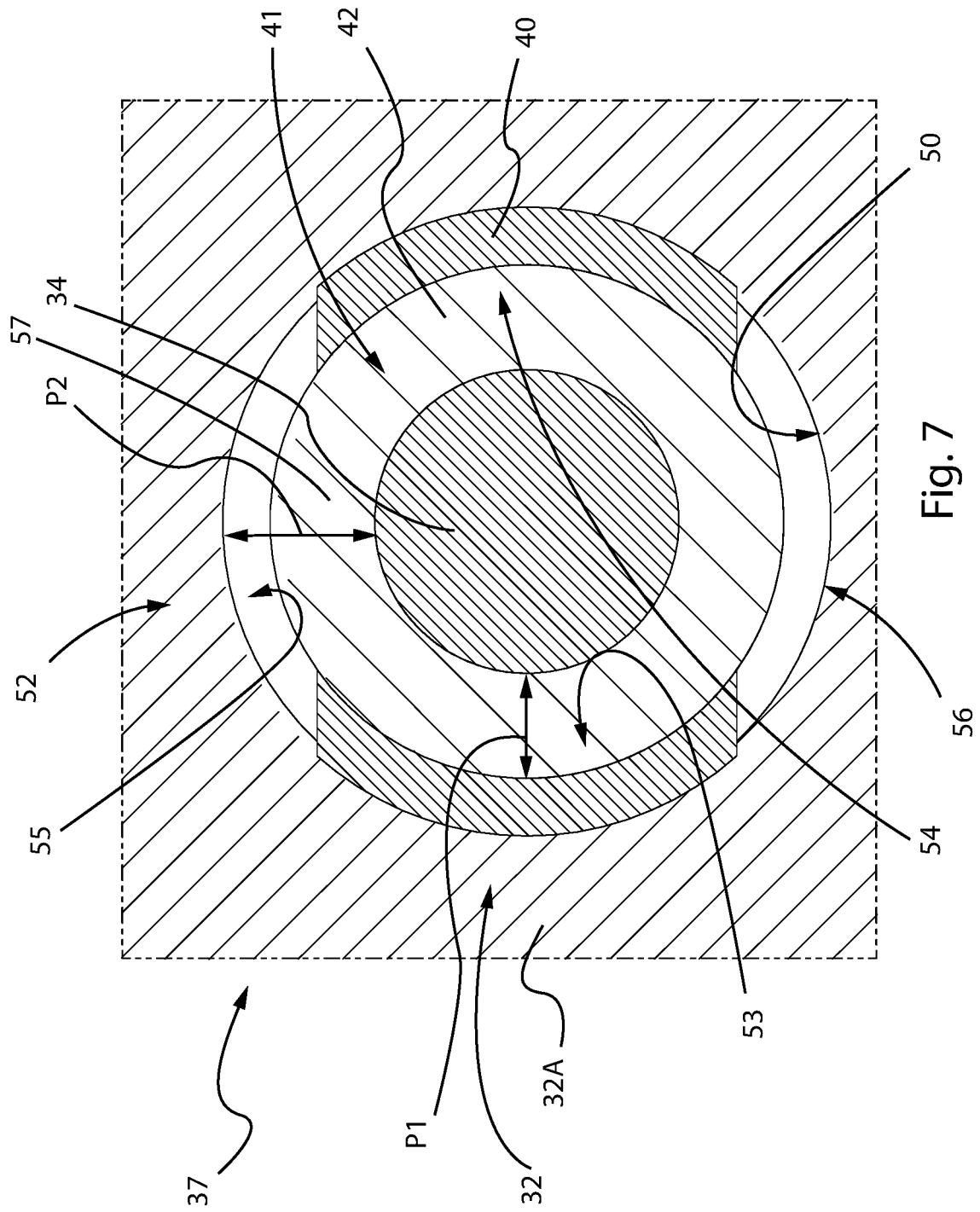
FIGS. 7-8 are sections at a particular of a push-button modified with respect to that of FIGS. 4-6, in two different operating conditions.
Figure 8:
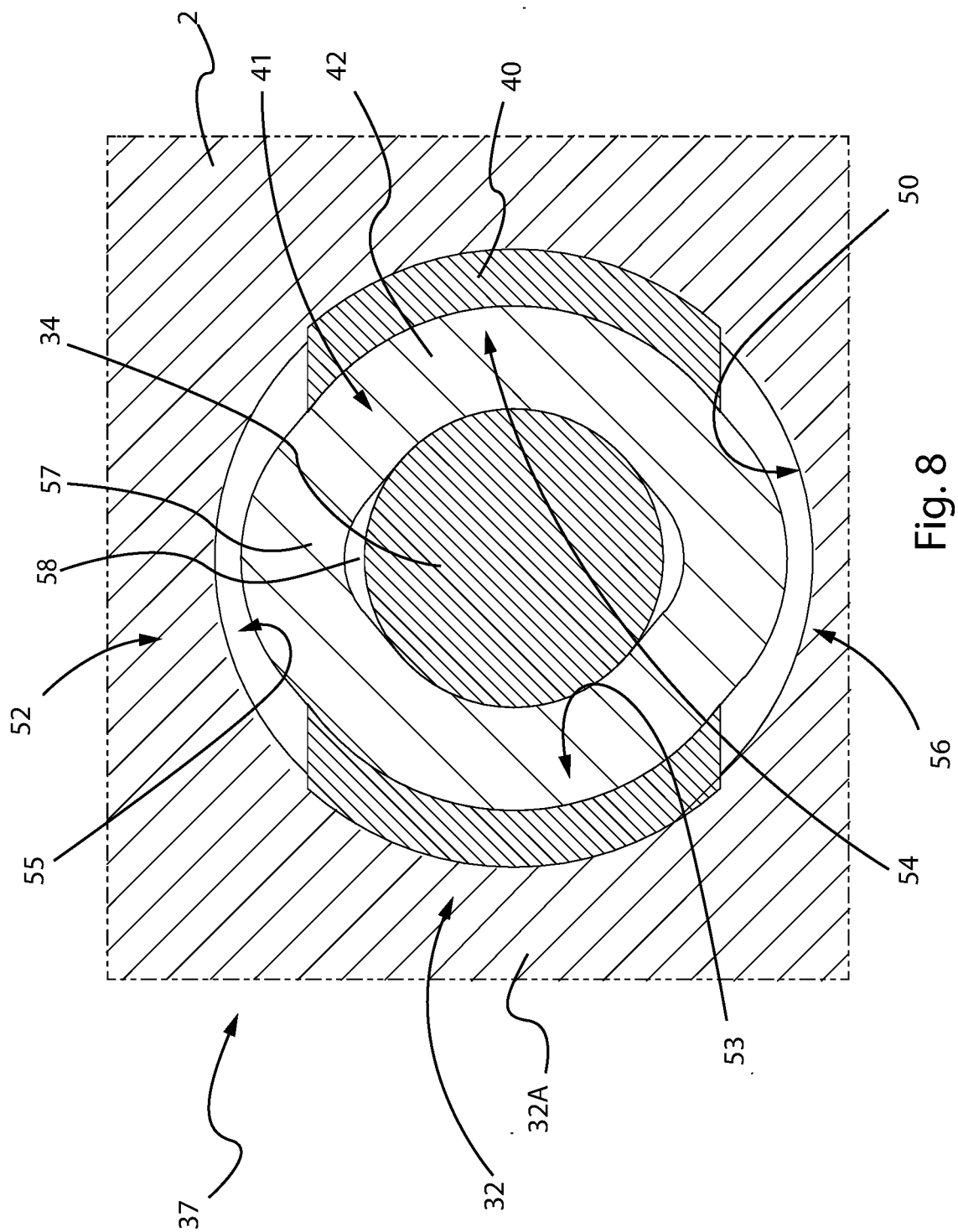
Figure 9:
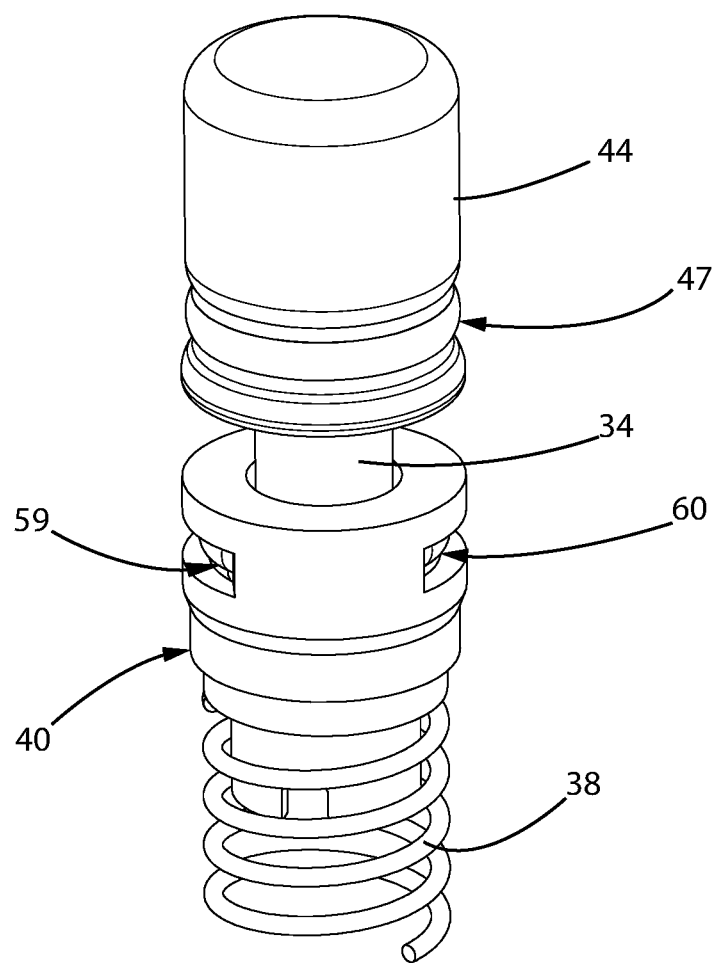
FIG. 9 is a partially exploded perspective view of the push-button of FIGS. 7-8, its sliding seat being omitted.

To the end, among others, of reducing or totally eliminating the drawbacks emphasised above, the sliding fit between the main body 34 of the push-button 23 and the sliding seat 32 may, alternatively to what has been described above, be made as shown totally schematically in FIGS. 7-9.

The annular seat 50 defined in the through cavity 41 provided in the sliding seat 32 (in the stop bushing 40 in the case shown) does not have a constant radial extent. In detail, in a region 52 of the sliding fit region 37 between the main body 34 of the push-button 23 and the through cavity 41 provided in the sliding seat 32, the annular seat 50 has two portions 53, 54 comparatively smaller in a radial direction, and an intermediate portion 55 therebetween comparatively larger in the radial direction. The extent in radial direction of the portion 55 may be continuously variable from a maximum value P2 at the center to the value P1 of the two portions 53, 54 as shown, but this is not strictly necessary.

In the case shown, the portion 55 is formed by a slit 59 in the bushing 40, communicating with the undercut groove 43 that defines the annular seat 50.

Figure 10:
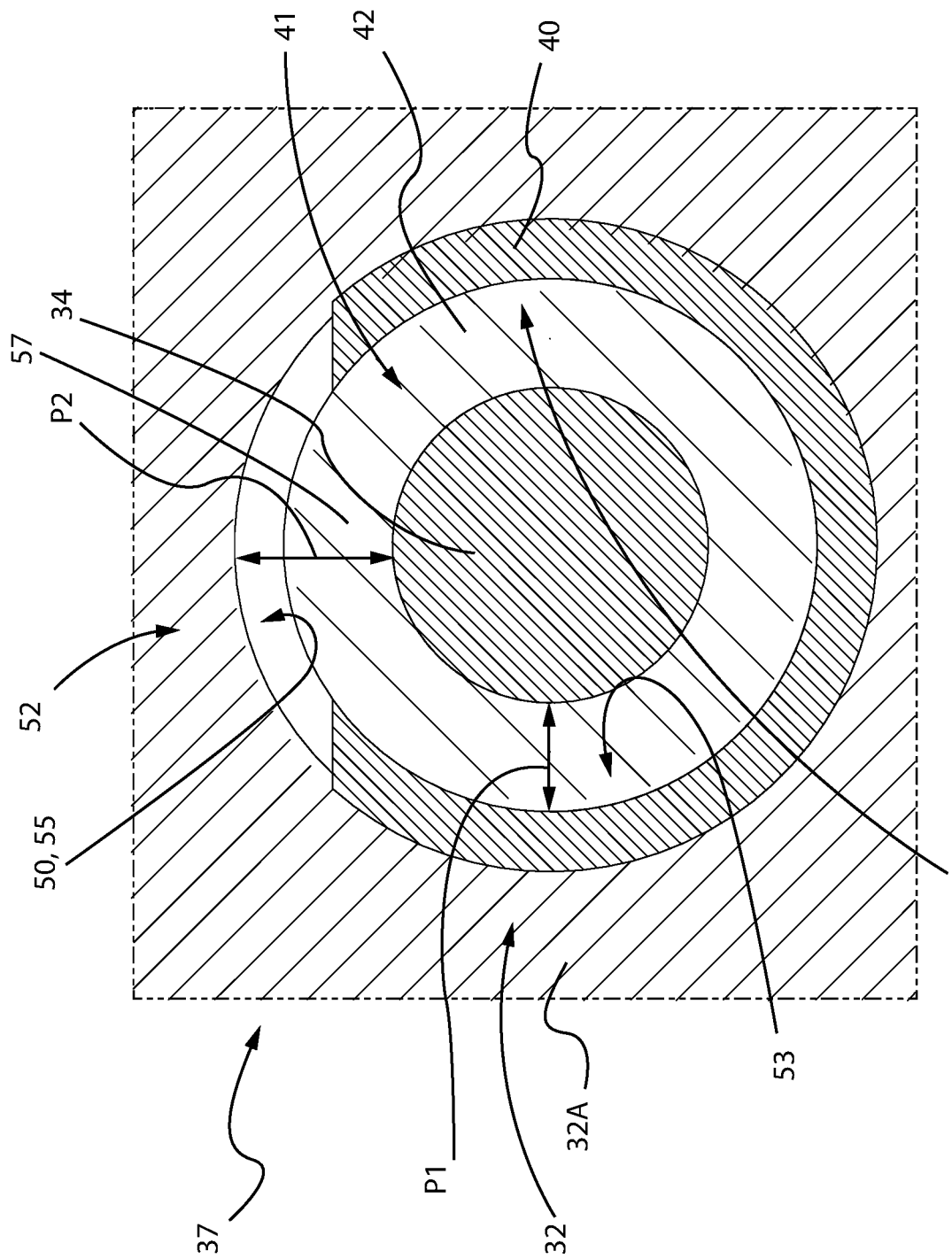
FIGS. 10-11 are views corresponding to FIGS. 7-8, of a push-button further modified with respect to that of FIGS. 4-6.
Figure 11:
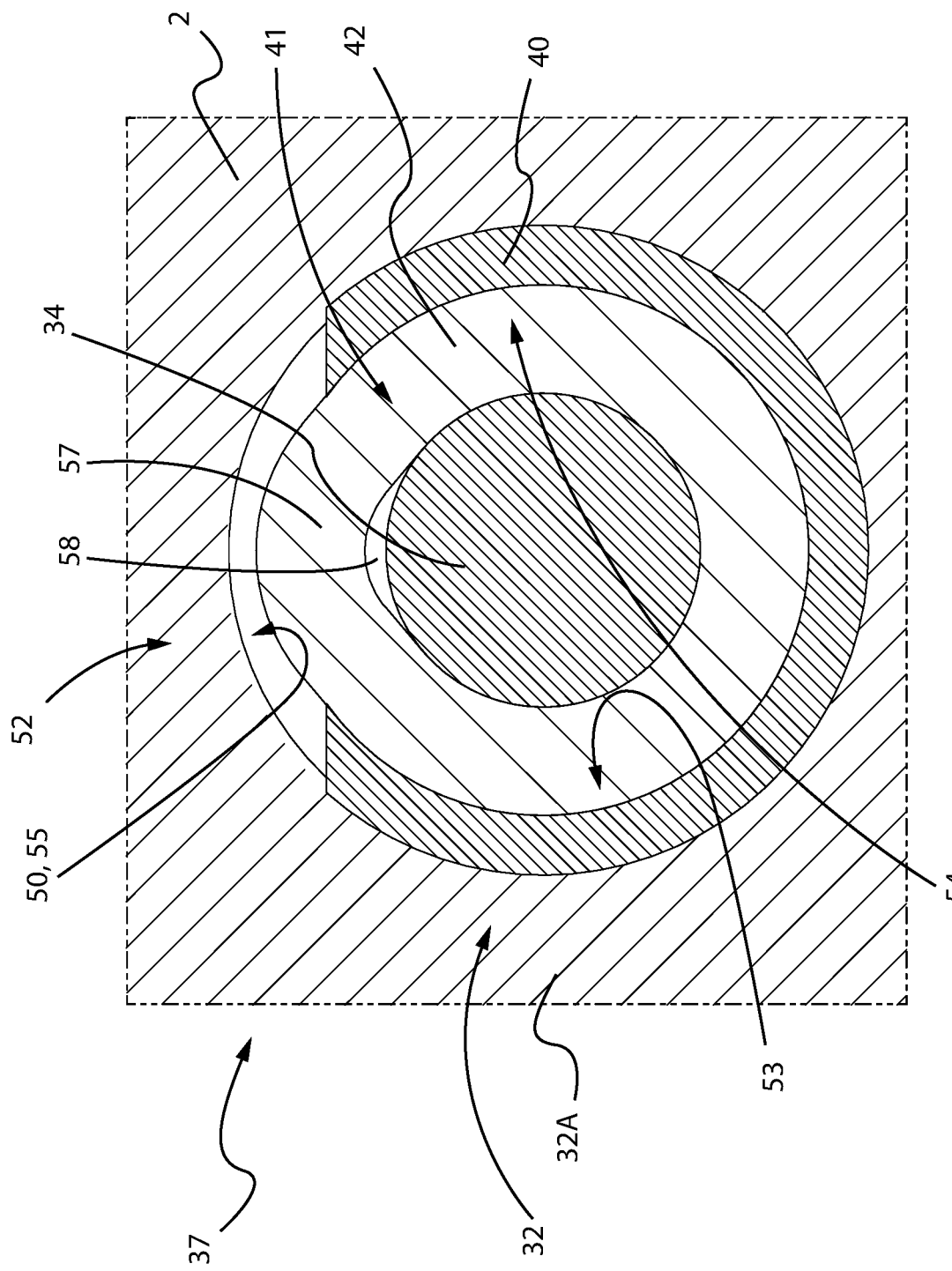
Figure 12:
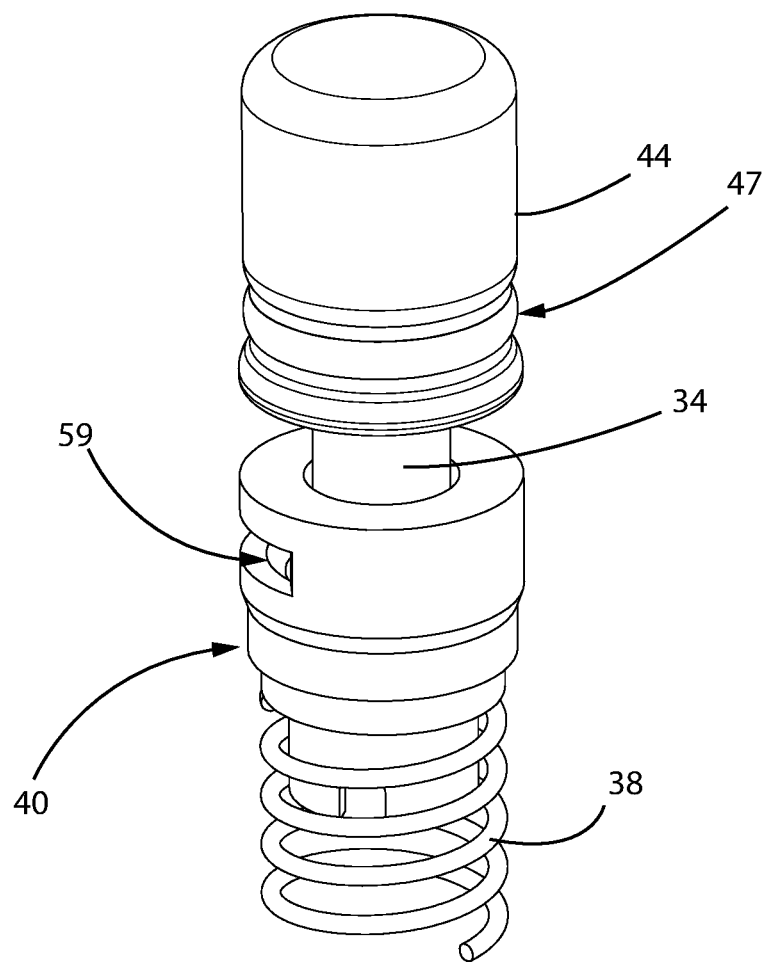
FIG. 12 is a partially exploded perspective view of the push-button of FIGS. 10-11, its sliding seat being omitted.

Furthermore, in the case shown there is an analogous conformation of the annular seat 50 in another region 56 of the main body 34, formed for example by another slit 60 in the stop bushing 40, but this is not necessary, as evident from FIGS. 10-12, wherein only some reference numerals are inserted for the sake of clarity. In the case of FIGS. 7-9, the region 56 is diametrically opposed to the region 52, but this is not necessary.

As shown in FIGS. 7 and 10, in the fully advanced position of the push-button 23 in the sliding seat 32, the gasket 42, mounted compressed in the annular seat 50, is only subject to the compression stress. A portion 57 thereof bridges the intermediate section 55 of the annular seat 50 between the two portions 53, 54. The entire extent of the gasket 42 contacts the main body 34 of the push-button 23, ensuring hermetic sealing.

While the push-button 23 moves back, the portion 57 of the gasket 42, subject to the above discussed overpressure, is free to curve towards the bottom of the intermediate section 55 of the annular seat 50, counteracting the establishment of the overpressure itself, because a gap is established between the gasket 42 and the main body 34 of the push-button 23.

The gap 58 in the condition of maximum deformation of the gasket 42 is manifest in FIGS. 8 and 11, representing the fully retracted position of the push-button 23.

As a consequence, the resistance offered by the sliding seat 32 against the push of the push-button 23 towards the retracted position is not increased by the overpressure, thus requiring less physical effort with the finger.

Additionally, during the push on the push-button 23 in the blind hole 36 (towards the fully retracted position) the above-mentioned gap acts as a vent for air, favouring expulsion of dust particles, dirt and water possibly present in the proximity of the mouth of the blind hole 36, hindering entry thereof in the blind bottom 36 itself. By avoiding that dust and dirt may jam the compression spring 38—or in any case hinder its proper operation-, actually the sealing function of the gasket 42 is enhanced.

A switch 22 like the one described above, with none, one or more of the above-mentioned optional features, represents an innovative aspect of the subject-matter disclosed herein, regardless of whether it is used in combination with other components and/or provisions described in the present disclosure.

In the case of the switch 22 described above, the two-state electric circuit 24 has a stable state corresponding to the extracted position of the push-button 23, wherein it is not pressed, and an unstable state corresponding to the retracted position of the push-button 23, wherein it is pressed. The stable state may for example correspond to the low state of the output of the magnetic sensor of the circuit 24, and the unstable state may correspond to the high state of the output of the circuit, or vice versa.

Hereinbelow reference will be made by way of an example to the above configuration. A configuration of the switch 22 wherein both states are stable is however possible, the changes to be made to what follows being within the skills of those skilled in the art in the light of the present description.

The controller 10 is configured to check the changes of state of the circuit 24 in a suitable manner. For example, a two-level output signal of the circuit 24 may be supplied to an input thereof, directly or possibly after a pre-treatment, and cause an interrupt in the controller 10 at each rising or falling edge; alternatively the controller 10 may monitor with a predetermined periodicity the value of the signal at its input and compare it with the previous value to recognize a change of state.

For the sake of clarity, hereinafter reference will be sometimes made to the conditions of pressed push-button 23 and of released push-button 23, and to the actions of press of the push-button 23 and of release of the push-button 23, instead of referring to the states of the circuit 24 of the switch 22 and to the related changes of state.

With reference to FIGS. 13-17, it is described, by way of a not limiting example, how the controller 10 may be configured to receive a plurality of different commands through use of the single switch 22 and of the single multicolour light source 21 of the user interface 20.

For expediency of the disclosure, in the flowcharts and hereinafter it is assumed that the controller implements one or more timers, which in practice may be of an increment or a decrement type, and may be implemented in any suitable way; furthermore the implementation of what is described with reference to a timer could also be significantly different from the use of a timer, the controller using for example plural timers, a real-time clock etc., as is evident for those skilled in the art.

Figure 13:
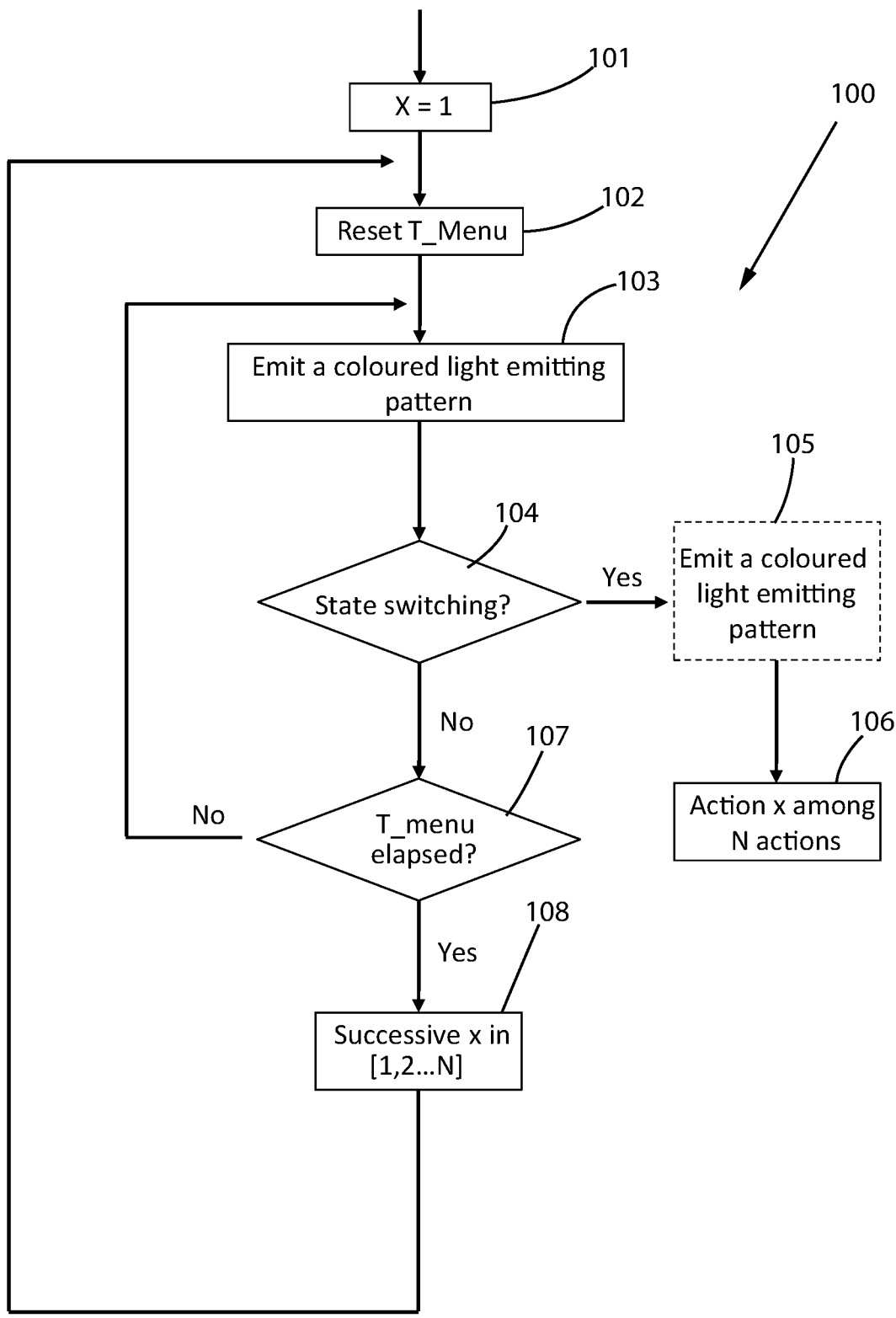
FIGS. 13-17 are flowcharts relating to the operation of a controller of the bicycle electronic equipment or respectively of a control method of a bicycle equipment or of a computer program.
Figure 14:
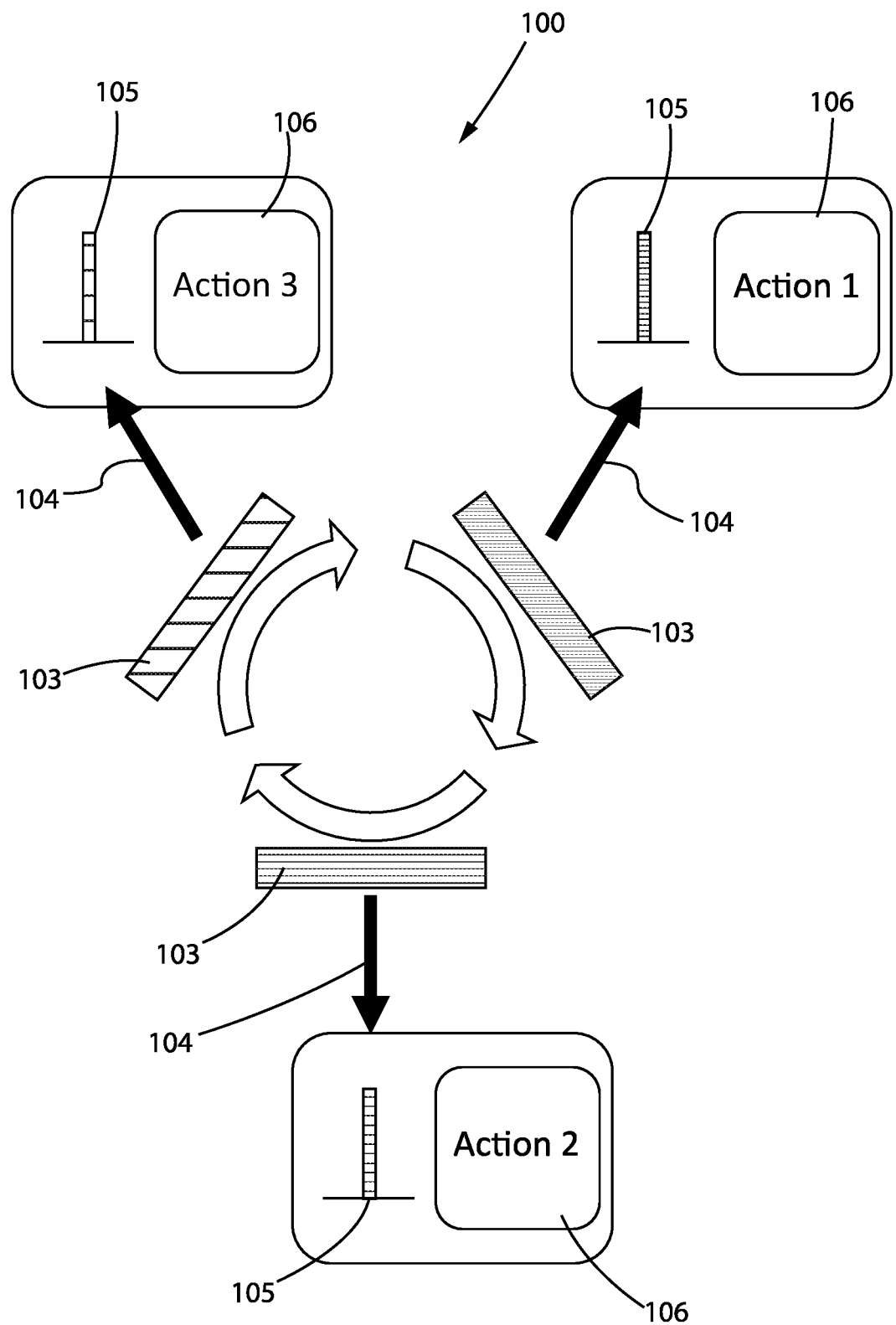

With reference to FIGS. 13-14, in a first mode, herein arbitrarily called "cyclic mode", the controller 10 is configured to:

a) make the light source 21 emit cyclically repeating a first number N of coloured light emitting patterns, with N>=3, wherein coloured light emitting patterns immediately consecutive in the cyclical repetition differ in color and/or type of emitting pattern, preferably at least in colour, b) monitor the state of the switch 22 during execution of step a), and c) perform a different action among a plurality of the first number N of different actions according to which of said N coloured light emitting patterns the source 21 is emitting upon the state switching of the switch 22.

As stated above, term "mode" referred to the controller 10 is used to identify a given portion of instructions executable by the controller, without necessarily implying any change of the state of the controller 10 or of the bicycle equipment comprising it.

In the flowchart of FIG. 13, which has to be understood as merely illustrative of a possible implementation of the above described methodological steps of the "cyclic mode", overall indicated with reference numeral 100, it is assumed that the source 21 is capable of emitting at least N coloured light emitting patterns, numbered 1 to N. At least some of these coloured light emitting patterns differ in colour and/or in emitting pattern type, so as to be able to satisfy the above-mentioned condition that two coloured light emitting patterns immediately consecutive in a cyclic repetition differ. Therefore, for example if N=3, three different coloured light emitting patterns will be required, but if N=4, three will suffice, wherein the controller may cyclically repeat sequence A-B-A-D, etcetera.

Each of said coloured light emitting patterns is selected among:
continuous emission of a single colour,
emission in the form of a pulse of one colour,
emission in the form of a pulse train at a preselected frequency, of a single colour,
emission in the form of a pulse train at a preselected frequency, of two or more alternate colours,
emission in any combination thereof,
wherein said preselected frequency may be individually selected for each of said coloured light emitting patterns.

The number N is greater than or equal to three.

In case of N=3, if the distinction is made, merely by way of an example, by colour (besides a possible distinction by pattern type), the colours may be for example blue, green and red.

In the flowchart and hereinbelow, it is assumed for expediency of the disclosure that the controller 10 uses an integer variable x which may solely assume the values 1 to N, but -as those skilled in the art will understand also in the light of the present description—the implementation of the flowchart might also be considerably different from the use of such a variable, and use for example plural variables, interrupt signals, plural timers, a real time clock, etc.

Variable x is set to value 1 in a block 101.

In the case shown, the controller 10 implements a timer set to a prefixed time duration, T_menu, which is reset in a block 102.

In a successive block 103, the controller 10 makes the source 21 emit the coloured light emitting pattern associated with the number represented by the current value of variable x, hereinafter called in short pattern x. This may entail switching the source 21 on if it was switched off, switching it off and switching it on if it was switched on in another colour, or it may be just a change of colour, according for example to the practical embodiment of the source 21. By switching the source 21 off and immediately re-switching it on during a colour change, the visual perception may be sharper. Furthermore, it may entail the change of an emitting frequency.

For example, the light in block 103 may be emitted as continuous emission of one colour, and this assumption will mainly be referred to hereinafter, merely by way of a non-limiting example.

In a successive decision block 104, the controller 10 checks whether a state switching of the switch 22, namely of its circuit 24, occurred.

In the affirmative case, the controller 10 may, in a completely optional block 105, make the source 21 emit a coloured light emitting pattern.

In block 105, for example a light pulse may be emitted, preferably of the colour of the pattern x the source 21 is emitting upon the state switching of the switch 22 detected in block 104.

Preferably the preselected emitting pattern is different from that used in block 103.

In a successive block 106, the controller 10 performs action x selected among N actions, which are assumed associated with the values 1 to N in a suitable manner in controller 10.

As said above, term "action" is broadly used and may comprise any sequence of instructions, which may involve the source 21 or not, and which may involve the user, regarding interaction with the push-button 23 and/or with other devices and components of the bicycle equipment 1, or not. Some merely illustrative actions are described hereinafter.

At the end of the execution of action x, the controller 10 may remain in the "cyclic mode" and thus actually return to execution of block 101, it may return to execution of block 102, or it may enter another node, also according to the specific action performed.

If, on the other hand, in decision block 104 the controller 10 has not detected any state switching of the switch 22, in a successive block 107 the controller 10 checks whether the timer has elapsed, namely whether the prefixed time duration T_menu has passed. In the negative case, the controller 10 returns to execution of block 103, so that the source 21 does not change colour.

Upon passing of the prefixed time duration T_menu, i.e. upon the positive outcome of the check of block 107, the controller 10, in a block 108, makes variable x take on the successive value in the cyclic set of values 1, 2, . . . N. In other terms, the value successive to value N is value 1.

Those skilled in the art will understand that the check of decision block 104 may be implemented through any one of the above discussed manners.

It is understood that the user interface 20 allows the operator to input a specific command to the controller 10 among N different commands, by acting on the push-button 23 while the source 21 is emitting the coloured light emitting pattern corresponding to the desired command, thus implementing some sort of command menu. In this manner, a single push-button 23 suffices to receive a plurality of different commands from the user, and the bicycle equipment may be small and light, all factors of great importance in the field of bicycle components.

In FIG. 14 a graphical representation of a specific implementing example of the "cyclic mode" 100 is provided, wherein it has been assumed for the sake of simplicity that N=3, it has been assumed that the emitting pattern preselected in step 103 is continuous emission of a single colour, and that in step 105 it is a single pulse of the same colour as step 103, and it has been assumed that the time duration of the emission is equal for all 3 colours.

Figure 17:
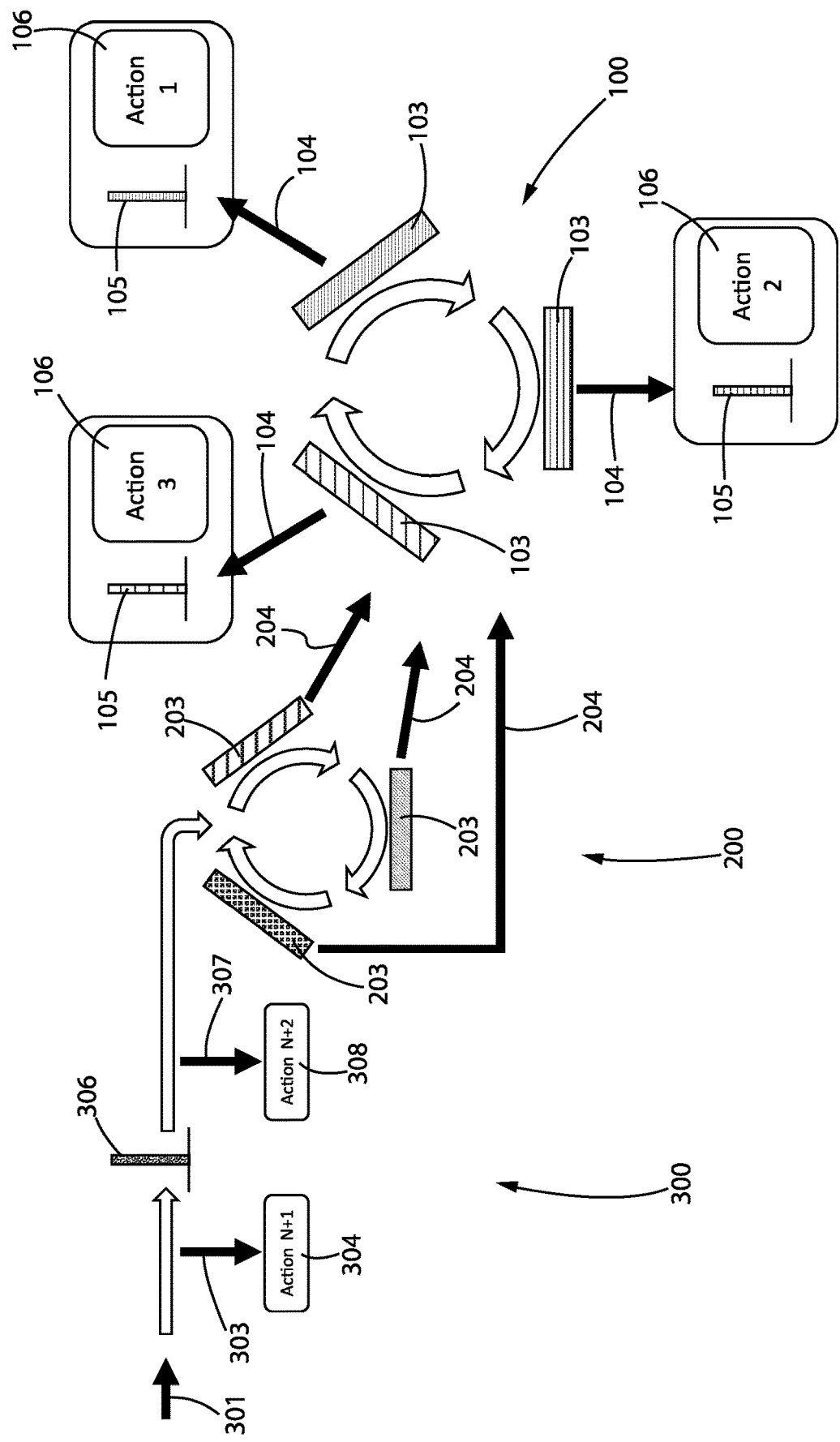

In such a figure, as well as in the successive FIG. 17, empty arrows indicate the passing of time, solid arrows indicate a state switching of the switch 22, and rectangles indicate the emission of coloured light by the source 21, wherein different fillings of the rectangle indicate different colours, and the width of the rectangle indicates the emission duration, so that a wide rectangle indicates that the source 21 is held switched on, an isolated narrow rectangle on a line indicates a light pulse, a series of narrow rectangles on a line indicates a pulse sequence, the distance between the narrow rectangles indicating, in a totally qualitative manner, the frequency of the pulses in the sequence.

Instead of using a prefixed duration T_menu equal for all of the N colours, one or more different durations may also be used.

The controller 10 may be configured to have one or more other modes, different from the cyclic mode described above.

For example, the controller 10 may be configured to set up in the above described "cyclic mode" upon occurrence of a (second) state switching while it is in a second mode, arbitrarily called herein "access-to-cyclic-mode mode". It is noted that the state switching indicated herein as second state switching is prior in time to the first state switching discussed above, that causes the positive outcome of decision block 104.

As stated above, the ordinal numbers referred to the state switchings should be understood as merely qualifiers to distinguish them from each other, without implying neither any specific time sequence thereof, which is indicated instead with adjectives "prior" and "successive", nor the fact that it is a matter of opposite state switchings between the two states of the two-state electric circuit 24.

On the other hand, when the second state switching that sets up the controller 10 in the "cyclic mode" 100 is a state switching opposed to that causing the positive outcome of decision block 104, the user interface 20 may turn out to be of more convenient use, as will be better understood hereinafter.

Figure 15:
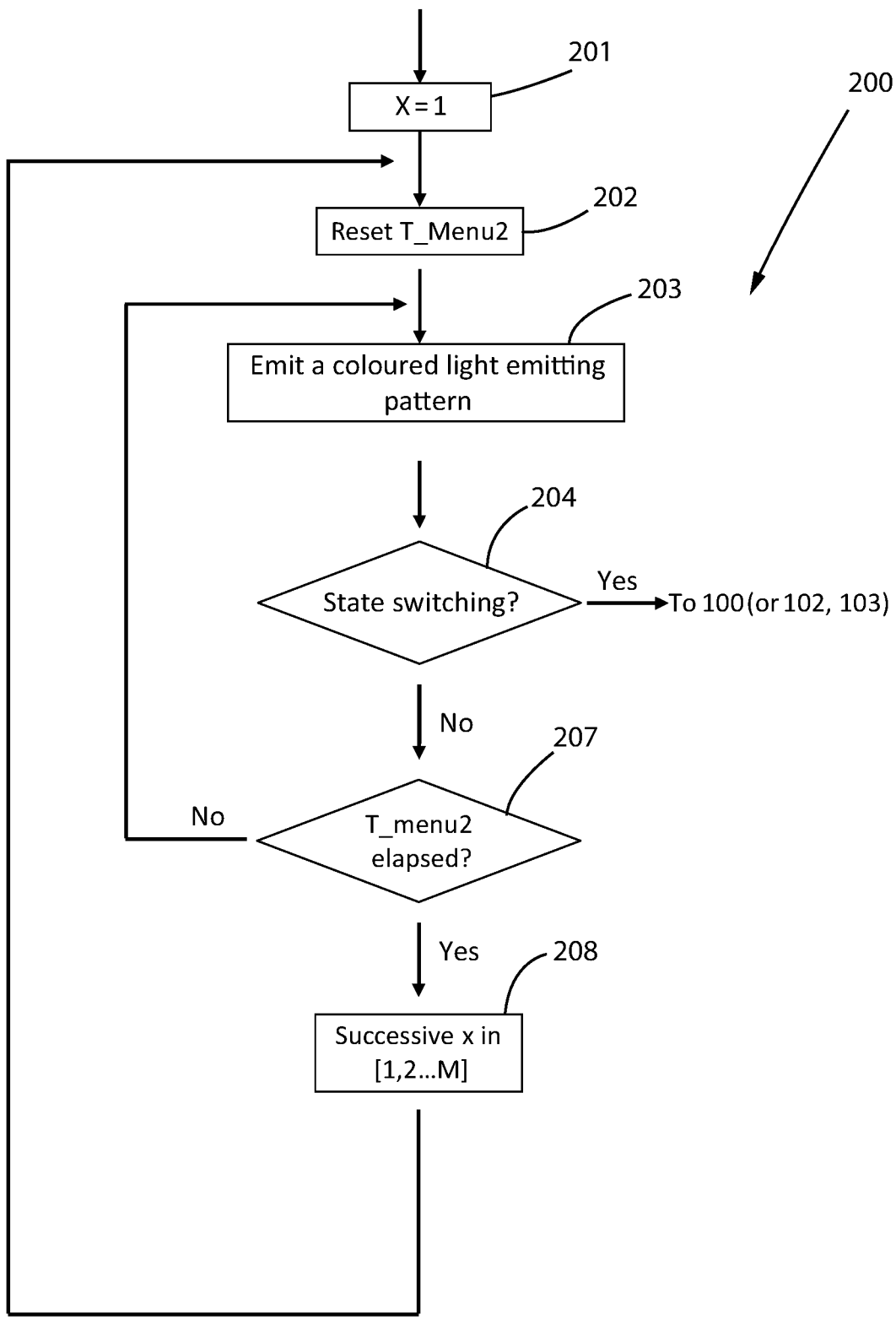

FIG. 15 is a flowchart that has to be meant as merely illustrative of a possible implementation of the methodological steps of the "access-to-cyclic-mode mode", overall indicated with reference numeral 200.

Such an implementation comprises blocks 201, 202, 203, 204, 207, 208 totally analogous to blocks 101, 102, 103, 104, 107, 108, with the only differences that the prefixed number is in general a number M>=3, which may be equal to or different from N, and that in blocks 202, 207 a time duration T_menu2 is used, that may be equal to or different from the time duration T_menu. All the considerations described above with reference to FIG. 13 apply, except as indicated below.

Preferably, M=N and, even more preferably, the entire set of the N coloured light emitting patterns is the same used in the "cyclic mode" 100 in which the data processing system 10 sets up upon the second state switching of the switch while is in the "access-to-cyclic-mode mode" 200, and to this assumption reference will be made hereinafter merely by way of an example.

When the state switching is detected, positive outcome of decision block 204, the controller switches to the "cyclic mode" 100, wherein block 101 of that mode may also be omitted, as well as possibly block 102; thus the source 21 may be held/made to emit pattern 1, or it may remain switched on in the current pattern x.

Thus, in the "access-to-cyclic-mode mode" 200, the controller 10 is configured to d) make the light source emit cyclically repeating a second number M of coloured light emitting patterns, with M>=3, said second number M being equal to or different from the first number N, wherein coloured light emitting patterns immediately consecutive in the cyclic repetition differ in colour and/or type of emitting pattern, and e) monitor the state of the switch during the execution of step a) in order to detect said second state switching.

In the preferred case indicated above, in the "access-to-cyclic-mode mode" 200, the controller 10 is configured to d) make the light source emit cyclically repeating said N coloured light emitting patterns, monitoring the state of the switch 22.

Differently from the "cyclic mode", however, in the "access-to-cyclic-mode mode" the controller 10 ignores -in the sense that it does not consider—the current value of variable x upon the state switching of the switch 22. From another point of view, in this mode the user interface 20 allows the operator to access the previously described command menu, acting on the push-button 23, for example releasing it, in any moment while the source 21 is cyclically emitting according to the three or in general M or N coloured light emitting patterns, regardless of the specific colour.

The controller 10 may in turn set up in the above described "access-to-cyclic-mode mode" from another mode, arbitrarily called herein "sequential mode".

Figure 16:
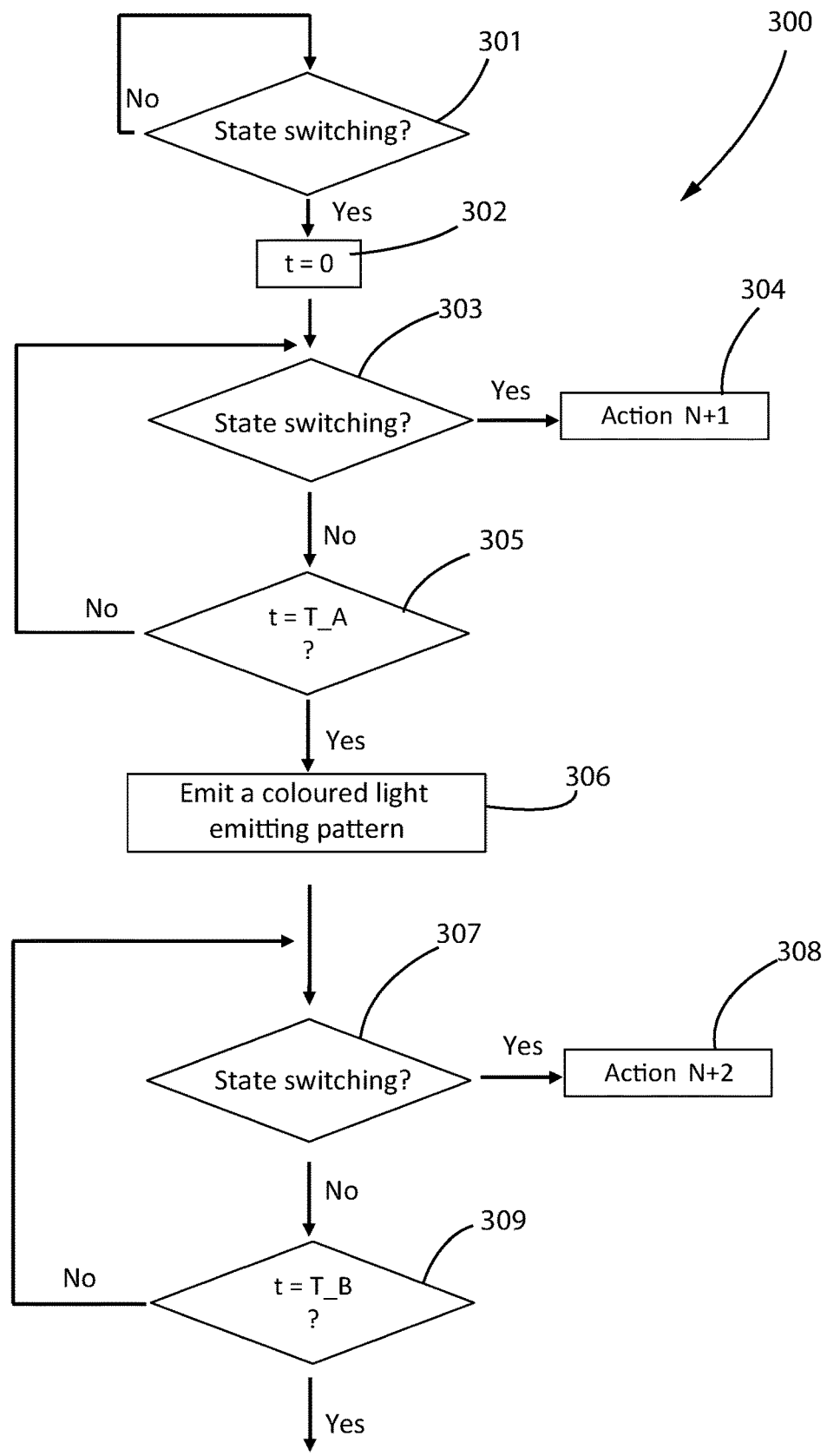

FIG. 16 is a flowchart that has to be meant as merely illustrative of a possible implementation of the methodological steps of the "sequential mode", overall indicated with reference numeral 300.

In a decision block 301, the controller 10 checks whether a state switching of the switch 22 occurred, and it returns to said block until the state switching. When the state switching occurs, the controller 10 in a block 302 starts an incremental timer— although it might use a decrement timer or plural timers or other manners for monitoring the passing of time.

In a successive decision block 303, the controller 10 again checks whether a state switching of the switch 22 occurred, and in the affirmative case in a block 304 it performs an action, different from the N actions associated with the "cyclic mode" 100, and indicated as action N+1. In the negative case, the controller 10 checks in a block 305 whether the timer has reached a threshold value T_A and, in the negative case, it returns to decision block 303.

When the timer has reached the threshold value T_A, the controller 10, in a block 306, makes the source 21 emit a coloured light emitting pattern, indicated as pattern N+1 because it is preferably, although not necessarily, different from the N, and possibly from the M, coloured light emitting patterns associated with the "cyclic mode" 100 and/or with the "access-to-cyclic-mode mode" 200. Merely by way of an example, the source may emit a pulse of purple light.

In a successive decision block 307, the controller 10 again checks whether a state switching of the switch 22 occurred, and in the affirmative case it performs an action, indicated as action N+2, different from the N actions associated with the "cyclic mode" 100 and from the action N+1 of block 304. In the negative case, the controller 10 checks in a block 309 whether the timer has reached a threshold value T_B, greater than the threshold value T_A, and, in the negative case, it returns to decision block 307.

When the timer has reached the threshold value T_B, the controller 10 sets up in the "access-to-cyclic-mode mode" 200.

Therefore, in the case shown the controller 10 sets up in the "access-to-cyclic-mode" mode 200 after having counted through a timer the passing of a first prefixed time duration (T_B) from a state switching of the switch (detected in block 301) without any other state switching of the switch 22 intervening (that otherwise would be detected in block 303 or in block 307).

FIG. 17 is a graphical representation of the three modes 100, 200 and 300 described above, under the assumptions of the above described of FIG. 13 and under the additional assumption that in step 306, a single light pulse of a colour N+1 is emitted.

Summarising, in the "sequential mode" 300, starting from a state switching of the switch 22, for example due to the press of the push-button 23, three time periods are defined, the first two of a respective prefixed duration (respectively of duration T_A and T_B−T_A) during which the source 21 is switched off, and that are visually distinguishable through the emission between them, for example, of the pulse of colour N+1 or according to another coloured light emitting pattern, among said N ones or said M ones, or still different.

Furthermore, the second time period is clearly visually distinguishable from the third and last time period, of a duration undefined beforehand, wherein the controller 10 sets up in the "access-to-cyclic-mode mode" 200 and the source 21 emits in cyclic sequence according to the M coloured light emitting patterns. An action on the same push-button 23, for example the release of the push-button 23, during each of the three or M time periods has a different effect, namely it emits a different command to the controller 10, embodying a sort of menu wherein the menu described above with reference to the "cyclic mode" 100 is nested.

In a simpler embodiment, only two time periods may be defined, that need not be distinguished through the light pulse or other coloured light emitting pattern emitted in block 306 because the second time period ("access-to-cyclic-mode mode" 200) is already visually distinguishable from the first time period during which the source 21 is switched off.

In more complex embodiments, vice versa, even more than three time periods may be defined, distinguishing them for example through separating light pulses (o other coloured light emitting patterns), analogously to what is made between the first and the second time period described above.

In general, in the "sequential mode" 300 an action on the push-button 23 inputs a different command according to the time period during which it occurs.

The controller 10 may therefore be configured to, in the "sequential mode" 300, starting from a state switching of the switch (detected in block 301), define two or more time periods (of durations T_A, T_B, T_C, . . . ), performing a different action and exiting from the "sequential mode" 300 upon a successive state switching in each time period different from the last one, and setting up in the "access-to-cyclic-mode mode" 200 in the last of said time periods, and, in case the time periods are more than two, make furthermore the source emit, between consecutive two time periods not including the last one, a coloured light emitting pattern, preferably different from said N, and possibly from said M, coloured light emitting patterns, for example a light pulse of a different colour from the colours used in the N or M coloured light emitting patterns.

In a particularly effective configuration, the first state switching detected in block 301 of the "sequential mode" 300 is the press of the push-button 23, and the successive state switching, detected in one of blocks 303, 307 of the "sequential mode" 300 or in block 204 of the "access-to-cyclic-mode mode" 200, is the release of the push-button 23, while the state switching detected in the block 104 of the "cyclic mode" 100 is a second press of the push-button 23. Therefore, the user keeps the push-button pressed and releases it after a while, after a medium time, or for a prolonged period according to whether he/she desires to perform action N+1 or action N+2 or whether he/she desires to perform one of the N actions; in the latter case, once the source 21 has started the cyclic sequence of coloured light emitting patterns, the user presses again the push-button 23 during the coloured light emitting pattern associated with the desired action 1, 2, . . . N, for example releasing it straight afterwards.

It is understood that in the "cyclic mode" 100 and/or in the "access-to-cyclic-mode mode" 200 and/or in the "sequential mode" 300, the controller 10 may also monitor the passing of one or more prefixed maximum time intervals or timeout from one or more events, for example following a switching of the switch 21 without any opposed switching of the switch 21, and set up in a different operating mode, among those mentioned above or still other ones, upon passing of the prefixed maximum time interval(s).

It is further understood that the controller 10 may be configured to ignore, in one or more of the above checks, state switchings of one type, for example ignore the release of the push-button 23 or vice versa ignore the press, the changes to be made being within the skills of those skilled in the art in the light of the present description.

The controller 10 may have, besides a fully operating mode, a low consumption or "sleep" mode, wherein it enters for example after a prefixed time period during which it does not receive any signal from the movement detector 26 and/or is not in communication, through the communication device 25, with any other bicycle equipment, the latter for example may be the case of a derailleur configured to receive commands from a manual control device, directly or through a third bicycle equipment. The controller 10 may exit from the low consumption mode, for example, when the movement detector 26 detects that the bicycle is moving and/or has been shaken.

The controller 10 may be configured not to be awakened from the low consumption mode by actuation of the push-button 23 and/or to ignore the state of the switch 22 while it is in low consumption mode.

The controller 10 may be configured to have still one or more further modes, besides those described above.

As mentioned, the "actions" that are performed in blocks 106, 304, 308 and/or during the possible additional modes of the controller 10 may be of the most various kind. In general, each action may involve the source 21 or not, and it may involve the user, regarding the interaction with the push-button 23 and/or with other devices and components of the bicycle equipment 1, or not.

In general, the controller may be configured to make the source 21 emit a coloured light emitting pattern, equal to or different from those described above with reference to the three modes, in order to provide a visual indication to the user relating to the execution of the action.

The light may be emitted for a prefixed time interval, or until a prefixed event internal to the bicycle equipment, or until an event performed by the user.

Some actions may require, for example, that the user confirms a request, acting again on the push-button 23.

Some merely illustrative actions include:
- the controller 10 performs a factory reset of its own parameters and/or of the parameters of other devices of the bicycle equipment 1,
- the controller 10 sets up in a firmware update mode or Device Firmware Update or DFU mode, wherein it may receive an update from a device external to the bicycle equipment 1, through the communication device 25,
- the controller 10 sets up or attempts at setting up a new network or a previously set up network, with one or more other pieces of bicycle equipment, with a master or "central" role, or with a slave or "peripheral" role,
- the controller 10 deletes a "whitelist" of components of a previously set up communication network,
- the controller 10 commands the electric power supply unit 12, in case this is a smart battery provided with its own controller 13 and provided with the array of light sources 15, to switch on a percentage of light sources proportional to the percentage of residual charge,
- the controller 10 sets up in an adjustment mode of its own parameters and/or of the parameters of other devices of the bicycle equipment 1, what possibly also includes communication with another bicycle equipment in communication with that bearing the controller 10.

As far as term "parameter", as used herein, is concerned, it is noted that a controller uses—besides instructions—parameters, variables and constants: the value of a parameter is settable within a set of homogeneous and consistent values; the actual value of the parameter is acquired at the beginning of the execution of the relevant portion of the programming code, and is used during the execution, so as to become a constant during execution of the code, in contrast to the value of a variable that may vary, also continually, during the execution of the programming code, and to the value of a constant that may not be changed without changing the programming code itself.

Some actions may require, for example, that the user removes the electric power supply unit 12 (for example the deletion of the whitelist); other actions may require that the user interacts with the bicycle equipment 1 itself in other manners, or that the user interacts with another bicycle equipment in communication with that bearing the controller 10, an example being represented by the setting of values of parameters of the geared motor 9 of a derailleur through the actuation of manual actuation members provided on a manual control device mounted on the handlebars. These required actions may be visually indicated to the user through the emission of a preselected coloured light emitting pattern, for example a sequence of yellow pulses at a high frequency.

It is once more emphasised that the invention disclosed herein, including all variants and generalizations thereof, also applies to an electrically powered bicycle equipment different from a derailleur, for example one of those listed in the introductory part.

In some cases the push-button may be the only manual action member of the push-button type provided on the bicycle electronic equipment 1. In other cases, the push-button 21 may even be the only manual action member of the push-button type provided for.

In the case of some bicycle electronic equipment 1, for example in the case of manual control devices attachable to the handlebars or in proximity thereto, other manual actuation members are typically provided for, also of the push-button type.

It is however emphasised that, also in cases wherein the bicycle electronic equipment 1 comprises other manual actuation members, the user interface 20 described above which, with a single push-button 21, allows a congruous number of commands to be input, makes the bicycle electronic equipment 1 smaller and lighter with respect to the provision of more complex user interfaces, the functions that may be performed being equal.

An electronic bicycle component configured to be attached to the bicycle in a single location and comprising a data processing system, a multicolour light source and a single manual actuation member comprising a manual actuation push-button paired with a two-states switch represents an innovative aspect of the subject-matter disclosed herein, regardless of whether it is used in combination with other components and/or provisions described in the present disclosure.

In the case of the rear derailleur 2 shown, as mentioned the controller 10 and the interface 20 are housed in the support body 4, as is the geared motor 9, while the electric power supply unit 12 is supported by the proximal connecting arm 6. In this case an electric connection between the two components is provided for in a suitable manner. The various devices may be housed in more than two components or in the same component, equal to or different from those shown, avoiding the external electric connection, as in the case of the front derailleur 3 shown, wherein the controller 10 and the interface 20 are housed in the support body 4, as is the geared motor 9, and also the electric power supply unit 12 is supported by the support body 4.

Also in the case of the front derailleur 3 shown, the various devices may be housed in more than two components or in the same component, equal to or different from those shown.

Those skilled in the art will understand that the derailleur 2, 3 may have a shape also considerably different from that shown, and/or additional components not shown for the sake of simplicity.

The flowcharts of FIGS. 13-17 should be understood as also representative of a control method of a bicycle equipment, as well as of a computer program.

It is understood that the data processing system may be implemented in various hardware, firmware and/or software manners, locally and/or remotely, not necessarily by a single (micro)processor device. The various data—and control signals may be exchanged, directly or also indirectly, between the various components of the equipment through any cabled or wireless connection and through any suitable communication protocol or combination of different protocols.

The various embodiments, variants and/or possibilities of each component or group of components that have been described are to be meant as combinable with each other in any manner, unless they are mutually incompatible.

The above is a description of various embodiments of inventive aspects, and further changes can be made without departing from the scope of the present invention. The shape and/or size and/or location and/or orientation of the various components and/or the succession of the various steps can be changed. The functions of an element or module can be carried out by two or more components or modules, and vice-versa. Components shown directly connected to or contacting each other can have intermediate structures arranged in between them. Steps shown directly following each other can have intermediate steps carried out between them. The details shown in a figure and/or described with reference to a figure or to an embodiment can apply in other figures or embodiments. Not all of the details shown in a figure or described in a same context must necessarily be present in a same embodiment. Features or aspects that turn out to be innovative with respect to the prior art, alone or in combination with other features, should be deemed to be described per se, irrespective of what is explicitly described as innovative.

What is claimed is:

1. A bicycle electronic equipment configured to be attached to the bicycle in a single location, comprising:
   a controller, and
   a user interface, the user interface comprising;
      a multicolour light source, and
      a switch comprising a manual actuation push-button and a two-state electric circuit,
   wherein the controller is configured to, in a first mode,
      a) control the multicolour light source to emit cyclically repeating a first number N of coloured light emitting patterns, with N>=3, wherein coloured light emitting patterns immediately consecutive in the cyclical repetition differ in color and/or type of emitting pattern,
      b) monitor a state of the switch during execution of step a), and
      c) upon switching of the state of the switch, based on a coloured light and/or coloured light emitting pattern emitted at the time of switching, instruct a component of the bicycle not involving the multicolour light source to perform an action.

2. The bicycle electronic equipment according to claim 1, wherein controller is configured to set up in the first mode upon a second state switching of the switch while it is in a second mode.

3. The bicycle electronic equipment according to claim 2, wherein controller is configured to, in the second mode,
   d) make the multicolour light source emit cyclically repeating a second number M of coloured light emitting patterns, with M>=3, said second number M being equal to or different from the first number N, wherein coloured light emitting patterns immediately consecutive in the cyclic repetition differ in colour and/or type of emitting pattern, and
   e) monitor the state of the switch during the execution of step d) in order to detect said second state switching.

4. The bicycle electronic equipment according to claim 2, wherein controller is configured to set up in the second mode after having counted through a timer the passing of a first prefixed time duration from a third state switching of the switch without a fourth state switching of the switch intervening.

5. The bicycle electronic equipment according to claim 2, wherein controller is configured to, in a third mode, starting from a state switching of the switch, define two or more time periods, performing a different action and exiting from the third mode upon a successive state switching in each time period different from the last one, and setting up in the second mode in the last of said time periods, and, in case the time periods are more than two, making the multicolour light source emit a coloured light emitting pattern between two consecutive time periods not including the latest one.

6. The bicycle electronic equipment according to claim 1, wherein controller comprises a fully operating mode and a low consumption mode and is configured not to be awakened from the low consumption mode by actuation of the push-button and/or to ignore the status of the switch while it is in low consumption mode.

7. The bicycle electronic equipment according to claim 1, further comprising an electric power supply unit provided with its own data processing system and with an array of light sources, wherein said action is the issue from said controller to the data processing system of the electric power supply unit of a request to switch on a percentage of light sources of the array proportional to the percentage of residual charge.

8. The bicycle electronic equipment according to claim 1, wherein the controller is configured to, before, during or after an execution of said action, and/or in a mode different from said modes, make the multicolour light source emit a coloured light emitting pattern, among said N coloured light emitting patterns or different from said N coloured light emitting patterns.

9. The bicycle electronic equipment according to claim 1, wherein each of said coloured light emitting patterns is selected among:
continuous emission of a single colour,
emission in the form of a pulse of one colour,
emission in the form of a pulse train at a preselected frequency, of a single colour,
emission in the form of a pulse train at a preselected frequency, of two or more alternate colours,
emission in any combination thereof,
wherein said preselected frequency may be individually selected for each of said coloured light emitting patterns.

10. The bicycle electronic equipment according to claim 1, wherein controller is configured to wait, in the execution of an action, until a user acts again on the push-button.

11. The bicycle electronic equipment according to claim 1, wherein the push-button is the only manual actuation member of the push-button type provided on the bicycle electronic equipment.

12. The bicycle electronic equipment according to claim 1, wherein the bicycle electronic equipment is a derailleur and wherein the multicolour light source is in a position visible while mounting the derailleur on the bicycle and/or, during use, by a person not on board of the bicycle.

13. The bicycle electronic equipment according to claim 1, wherein the push-button comprises a magnet and the two-state electric circuit comprises a magnetic sensor.

14. The bicycle electronic equipment according to claim 13, wherein a bicycle electronic equipment component has a sliding seat of the push-button, the push-button comprising a main body to a first end of which the magnet is fixed, and being slidable in the sliding seat between an extracted position wherein a second end thereof opposed to the first end protrudes at least partially from the sliding seat so that it can be pressed, and a retracted position wherein the second end does not protrude or protrudes less from the sliding seat,
wherein the push-button and the two-state electric circuit are so mutually positioned that the magnetic sensor responds to a change in the magnetic field when the push-button moves between the extracted and retracted positions,
wherein the sliding seat comprises a blind hole,
wherein a sealing gasket is operatively interposed between the main body and the blind hole and
wherein the two-state electric circuit is housed in a hermetically closed chamber of the bicycle electronic equipment.

15. The bicycle electronic equipment according to claim 13, wherein a bicycle electronic equipment component has a sliding seat of the push-button,
wherein the push-button is slidable in the sliding seat between a fully advanced position wherein an end thereof protrudes at least partially from the sliding seat so that it can be pressed, and a fully retracted position wherein said end does not protrude or protrudes less from the sliding seat,
wherein the sliding seat comprises a blind hole,
wherein an annular seat is defined in a sliding fit region between the main body of the push-button and a through cavity provided in the sliding seat, and wherein a ring gasket is housed compressed in the annular seat,
wherein in at least one region, the annular seat has two portions comparably smaller in a radial direction, and an intermediate section therebetween, the intermediate section being comparatively larger than said two portions in the radial direction,
so that in the fully advanced position of the push-button, a portion of the gasket bridges the intermediate portion between said two portions, and while the push-button moves back, the portion of the gasket is free to curve in the intermediate portion of the annular seat.

16. A bicycle electronic equipment configured to be attached to the bicycle in a single location, comprising:
a controller, and
a user interface comprising;
a multicolour light source, and
a switch comprising a manual actuation push-button and a two-state electric circuit, wherein the controller is configured to, in a first mode,
a) control the multicolour light source to emit cyclically repeating a first number N of coloured light emitting patterns, with N>=3, wherein coloured light emitting patterns immediately consecutive in the cyclical repetition differ in color,
b) monitor a state of the switch during execution of step a), and
c) upon switching of the state of the switch, based on a coloured light emitted at the time of switching, instruct a component of the bicycle not involving the multicolour light source to perform an action.

17. A method of controlling bicycle equipment, the method comprising:
providing a bicycle electronic equipment configured to be attached to a bicycle in a single location, the bicycle electronic equipment comprising:
a controller, and
a user interface, the user interface comprising:
a multicolour light source, and
a switch comprising a manual actuation push-button and a two-state electric circuit,
controlling the multicolour light source to emit cyclically repeating a first number N of coloured light emitting patterns, with N>=3, wherein coloured light emitting patterns immediately consecutive in the cyclical repetition differ in color and/or type of emitting pattern,
monitoring a state of the switch, and
upon switching of the state of the switch, based on a coloured light and/or coloured light emitting pattern emitted at the time of switching, instructing a component of the bicycle not involving the multicolour light source to perform an action.

* * * * *